US008576326B2

(12) United States Patent
Kawamura

(10) Patent No.: US 8,576,326 B2
(45) Date of Patent: Nov. 5, 2013

(54) IMAGING APPARATUS AND METHOD OF CONTROLLING THE IMAGE DEPTH OF FIELD

(75) Inventor: Takashi Kawamura, Kyoto (JP)

(73) Assignee: Panasonic Corporation, Osaka (JP)

( * ) Notice: Subject to any disclaimer, the term of this patent is extended or adjusted under 35 U.S.C. 154(b) by 315 days.

(21) Appl. No.: 13/147,894

(22) PCT Filed: Dec. 3, 2010

(86) PCT No.: PCT/JP2010/007058
§ 371 (c)(1),
(2), (4) Date: Aug. 4, 2011

(87) PCT Pub. No.: WO2011/070755
PCT Pub. Date: Jun. 16, 2011

(65) Prior Publication Data
US 2011/0292275 A1    Dec. 1, 2011

(30) Foreign Application Priority Data
Dec. 7, 2009    (JP) ................................. 2009-277638

(51) Int. Cl.
G03B 13/00    (2006.01)
H04N 5/232    (2006.01)
(52) U.S. Cl.
USPC .......................................... 348/345; 382/255
(58) Field of Classification Search
USPC ................... 348/222.1, 345–356; 396/79–82; 382/255
See application file for complete search history.

(56) References Cited

U.S. PATENT DOCUMENTS

| 5,124,842 | A | 6/1992 | Honda et al. |
| 5,148,502 | A | 9/1992 | Tsujiuchi et al. |
| 6,587,148 | B1 | 7/2003 | Takeda et al. |
| 6,774,944 | B1 | 8/2004 | Fukuyama |
| 2008/0013941 | A1 | 1/2008 | Daley |
| 2010/0141802 | A1* | 6/2010 | Knight et al. ............... 348/240.3 |
| 2012/0327222 | A1* | 12/2012 | Ng et al. ........................ 348/135 |

FOREIGN PATENT DOCUMENTS

| DE | 2301800 | 10/1974 |
| JP | 5-27084 | 4/1985 |
| JP | 9-83858 | 3/1997 |
| JP | 3084130 | 9/2000 |

(Continued)

OTHER PUBLICATIONS

International Search Report issued Dec. 28, 2010 in International (PCT) Application No. PCT/JP2010/007058.

(Continued)

*Primary Examiner* — Nelson D. Hernández Hernández
(74) *Attorney, Agent, or Firm* — Wenderoth, Lind & Ponack, LLP

(57) ABSTRACT

An imaging apparatus (100) of the present invention includes a shift control unit (22) shifting an object-space focal point of the imaging apparatus (100) by shifting an image-space distance; and a shift pattern determining unit (21) determining a shift pattern of the image-space distance shifted by the shift control unit (22) in a frame period. The shift pattern determining unit (21) determine the shift pattern such that: a shift speed of the image-space distance increases from zero during an acceleration period included in the frame period; the image-space distance shifts at a constant speed during a constant speed period; and the shift speed of the image-space distance decreases to zero during a deceleration period, and each of the acceleration period and the deceleration period has a duration equal to or longer than one-tenth of the frame period.

8 Claims, 20 Drawing Sheets

(56) References Cited

FOREIGN PATENT DOCUMENTS

| JP | 3191928 | 7/2001 |
|----|---------|--------|
| JP | 2003-259194 | 9/2003 |
| JP | 2004-153497 | 5/2004 |
| JP | 4011704 | 11/2007 |
| WO | WO 2009120718 A1 * | 10/2009 |

OTHER PUBLICATIONS

E.R. Dowski and W.T. Cathey, "*Extended depth of field through wave-front coding*", Applied Optics, vol. 34, No. 11, p. 1859-1866 (1995).

A. Levin, R. Fergus, F. Durand and W.T. Freeman, "*Image and Depth from a Conventional Camera with a Coded Aperture*", ACM Transactions on Graphics, vol. 26, No. 3, Article 70, 70-1-70-9 (2007).

H. Nagahara, S. Kuthirummal, C. Zhou and S. Nayar, "*Flexible Depth of Field Photography*", European Conference on Computer Vision (ECCV), Oct. 16, Morning Session 2: Computational Photography (2008).

C. Tisse, H.P. Nguyen, R. Tessieres, M. Pyanet and F. Guichard, "*Extended depth-of-field (EDOF) using sharpness transport across colour channels*", Optical Engineering+Applications, Part of SPIE Optics+Photonics, Session 1—Imaging in the Optical Design Process: Depth of Field (2008).

W. Chi and N. George, "*Computational imaging with the logarithmic asphere: theory*", Optical Society of America, vol. 20, No. 12, Dec. 2003.

Y. Takahashi and S. Komatsu, "*Optimized free-form phase mask for extension of depth of field in wavefront-coded imaging*", Optical Society of America, Optics Letters, vol. 33, No. 13, Jul. 1, 2008.

Y. Takahashi et al., "*Optimized phase mask for wave-front coding: Extended DOF in off axis field*", with English translation, Optics & Photonics Japan 2007, p. 464-465 (27pC2), 2007.

Extended European Search Report (in English language) issued Apr. 19, 2013 in corresponding European patent application No. 10 835 682.5.

H. Nagahara, S. Kuthirummal, C. Zhou, S. Nayar: "Flexible Depth of Field Photography", European Conference on Computer Vision (ECCV), Oct. 16, Morning Session 2: Computational Photography, Oct. 12, 2008, pp. 60-73, XP019109354, Springer-Verlag, Berlin, Germany.

* cited by examiner

IMAGING APPARATUS AND METHOD OF CONTROLLING THE IMAGE DEPTH OF FIELD

TECHNICAL FIELD

The present invention relates to imaging apparatuses and methods of controlling the same and, in particular, to an imaging apparatus of which focal point shifts during the exposure period.

BACKGROUND ART

Typically, there are three main techniques to achieve an extended depth of field (hereinafter referred to as EDOF). The first technique (See Non Patent Literature 1) employs an optical element, referred to as a phase plate, inserted in the optical system in order to make a blur uniform in the scene depth direction. Then, the technique executes image-restoration processing on an image obtained through the blur uniformity, using a previously-measured blur pattern or a calculated blur pattern based on a simulation. Hence, the technique generates an EDOF image. This technique is introduced as the wave-front coding (hereinafter referred to as the WFC).

The second technique (See Non Patent Literature 2) employs an aperture of which pattern is modified, so that the distance to the focal plane is accurately measured for each of subregions of the image. Then, the technique executes image-restoration processing on each subregion, using a blur pattern which is based on each of previously-measured distances to a corresponding one of the subregions. Hence, the technique generates an EDOF image. This technique is introduced as the coded aperture (hereinafter referred to as the CA).

The third technique (See Non Patent Literature 3) involves shifting a focus lens or an imaging device during the exposure time in order to convolve images which are uniformly focused in the scene depth direction (in other words, obtaining a uniform blur in the scene depth direction). Then, the technique executes image-restoration processing on the image obtained through convolution, using a previously-measured blur pattern or a calculated blur pattern based on a simulation. Hence, the technique generates an EDOF image. This technique is introduced as the Flexible DOF (hereinafter referred to as the F-DOF).

There are other techniques than the above techniques. One of in the techniques (Non Patent Literature 4) involves estimating the depth and detecting the sharpness of the image, taking advantage of the on-axis chromatic aberration, and generating an all-focus image with image processing. Another technique (Non Patent Literature 5) involves making a uniform blur in the scene depth direction using a multifocal lens, and executing image-restoration processing on the image obtained through the uniformity using a previously-measured blur pattern or a calculated blur pattern based on a simulation. Compared with the first three techniques, however, the next two techniques fail to achieve as large an EDOF as the three techniques do.

In addition, there has been another technique referred to as the focal stack. This technique involves obtaining images each having a different focal point (focal position), and extracting a region-to-be-focused from each of the images. Then, the technique composes the extracted images to generate an EDOF image. Unfortunately, the technique requires many images to be obtained. Thus, the technique inevitably needs a relatively-long time period for obtaining the images, and occupies too much memory.

Various kinds of phase plates are proposed for one of the first three techniques, the WFC. Among the phase plates, the cubic phase mask (hereinafter referred to as the CPM) and the free-form phase mask (hereinafter referred to as the FPM) are introduced as the phase plates for obtaining the largest EDOF. In view of the image quality of the restored image (fewer artifacts), the FPM is more promising than the CPM (Non Patent Literature 6). As a weakness of the WFC, however, the phase plate inserted in the optical system tends to deteriorate the off-axis performance of the lens (Non Patent Literature 7). Specifically, the WFC cannot obtain as much a uniform blur with respect to incident light coming from other than the front as a uniform blur with respect to incident light coming from the front. As a result, when an image is restored with a use of an on-axis blur pattern, the off-axis quality of the restored image inevitably deteriorates.

The second technique among the first three techniques; namely the CA, employs an aperture having a modified pattern in order to increase the accuracy of the distance measurement. Due to the modified pattern inherent in the aperture of the technique, specific frequency components are lost from an obtained image and a restored image. In other words, the technique suffers image deterioration. Furthermore, the technique is not suitable for imaging in the dark since an amount of received light in the technique is typically less than that in an ordinary technique no matter how the shape of the aperture is to be modified.

The third of the first three techniques, the F-DOF, enjoys the most excellent image quality among all the three techniques, and achieves a large EDOF. The off-axis performance depends on the performance of the lens itself, which makes it easy to enhance the performance of the imaging apparatus. As an optical condition, however, the technique needs to employ an image-space telecentric lens since the same object needs to be convolved on the same position of the image even though the focal point shifts during the exposure.

The oldest application of the above EDOF technique is the one to microscopes. In the case of a microscope, the focal stack technique has long been used because a user can take time to obtain an image of a still object. The focal stack technique, however, requires much time and work as described above. Hence the EDOF has been disclosed in some references along with the F-DOF technique (Patent Literatures 1 to 4). When the F-DOF is used for the microscope, disclosed are the cases where, during the exposure, (i) a specimen; namely the object, is moved and (ii) the microscope tube is moved. Based on the premise of image-restoration processing after the exposure, it is reasonable to control the move such that a uniform blur is formed at all times on the object, since an image-restoration processing technique employing a single blur pattern is available (Patent Literature 5). In order to control the move, the object to be to moved should be moved at a constant speed in the case where the object is the imaging device. In the case where the focus lens is moved, the focus needs to be shifted as fast as the image plane shifting at a constant speed (Non Patent Literature 3). It is noted that the focus lens may be shifted from the far-end focal point to the near-end focal point and visa versa.

Recently, the EDOF technique has also been applied to a camera for cellular phones. The use of the EDOF technique for the camera contributes to making the camera smaller. In other words, the EDOF successfully obtains an all-focus image (all the objects in the image are focused) without an autofocus system.

In view of the application of the above techniques, the F-DOF itself is not adopted since the F-DOF requires a mechanism to shift the focus lens or the imaging device. Hence adopted is the WFC or the technique utilizing the on-axis chromatic aberration.

Another application to be considered is the one to regular digital still cameras and digital video cameras. In recent years, users have been looking for more user-friendly and further foolproof digital still cameras and digital video cameras. The EDOF technique is promising since the technique achieves an all-focus image, freeing a user from obtaining an out-of-focus image. In view of the application, the most excellent technique of all of the above techniques is the F-DOF since the F-DOF has the following features: (i) high image quality is available, (ii) the EDOF effect and the range of focus can be changed at the user's option, (iii) the technique is feasible with the application of a regular autofocus mechanism (no special optical system is required), and (iv) the user can easily switch between EDOF shooting and the regular shooting.

FIGS. 1 and 2 show structures required to achieve the F-DOF. FIG. 1 shows a structure of an imaging apparatus 500 which shifts a focus lens during the exposure period. The imaging apparatus 500 in FIG. 1 includes an imaging device 1, a lens 2, a shutter 3, a focus lens shift control unit 4, a shutter operation instructing unit 5, a release receiving unit 6, a focus lens initial position detecting unit 7, an exposure time determining unit 8, a focus lens position resetting unit 18, a synchronization managing unit 10, an image-restoration processing unit 11, a PSF storage unit 12, and an image data recording unit 13. Moreover, the lens 2 includes a focus lens 20 and a group of lenses other than the focus lens 20.

When the release receiving unit 6 receives an exposure start instruction from a user, the focus lens initial position detecting unit 7 detects the position of the focus lens 20 at that time (the initial position). Once the initial position is detected, the focus lens position resetting unit 18 shifts the focus lens 20 to a predetermined end position, such as the nearest end or the farthest end. Here, in a predetermined range of focus and with respect to the imaging apparatus 500, the nearest end is at the nearest distance to the imaging apparatus 500, and the farthest end is at the farthest distance from the imaging apparatus 500.

The focus lens position resetting unit 18 resets the focus lens 20, and at the same time, the exposure time determining unit 8 determines capturing parameters including a shutter speed and an f-number. As soon as the above operations end, the synchronization managing unit 10 gives an instruction to start exposure to the focus lens shift control unit 4 and the shutter operation instructing unit 5. Simultaneously, the synchronization managing unit 10 gives an instruction to the focus lens shift control unit 4 so that, within the exposure period and based on the end point of the focus lens 20 reset by the focus lens position resetting unit 18, the focus lens shift control unit 4 shifts the focus lens 20 (i) from the nearest end to the farthest end when the end point is at the nearest end, and (ii) from the farthest end to the nearest end when the end point is at the farthest end.

FIG. 3 shows how the position of the focus lens 20 is reset before the exposure, and how the focal point on the imaging device plane (image-space distance) is shifted during the exposure. It is noted that the shift speed of the focal point is controlled by a shift control instruction given to the focus lens 20, so that the focal point shifts on the imaging device plane at a constant speed. Typically, in the Gaussian lens law, the following relationship (Expression 1) holds where the distance between the object and the lens is u, the distance between the lens and the imaging device is v, and the focal length is f as shown in FIG. 4:

$$\frac{1}{f} = \frac{1}{u} + \frac{1}{v}.$$  Expression 1

When there are two or more lenses, the principal point is regarded as the position of the lens. As an example, FIG. 5 shows the relationship between u and v when f is 18[mm]. When the focus lens 20 shifts, the image-space distance v between the principal point and the imaging device shifts. Here, the shift control instruction is given to the focus lens 20 so that the focal point shifts on the imaging device plane at a constant speed. Accordingly, the image-space distance v shifts at a constant speed. It is noted that, as shown in FIG. 5, the shift of the image-space distance v at a constant speed does not necessarily mean the shift of the object-space distance u at a constant speed. Here the object-space distance u is a distance between the front focal plane and the principal point. Moreover, the ordinate in FIG. 3 indicates the image-space distance v. In other words, it is noted that the magnitude relation reverses between (i) the exposure time and the object-space distance u and (ii) the exposure time and the image-space distance v. Specifically, the nearest end and the farthest end of the object-space distance u have the magnitude relation reversed in the image-space distance.

FIG. 2 shows a structure of an imaging apparatus 501 which shifts an imaging device during the exposure time. The imaging apparatus 501 in FIG. 2 includes the imaging device 1, the shutter 3, the shutter operation instructing unit 5, the release receiving unit 6, the exposure time determining unit 8, the image-restoration processing unit 11, the PSF storage unit 12, the image data recording unit 13, an imaging device initial position detecting unit 14, a synchronization managing unit 16, an imaging device shift control unit 17, and an imaging device position resetting unit 19. It is noted that the same constituent features between FIGS. 1 and 2 share the same numerical symbols. Thus detailed description thereof shall be omitted.

When the release receiving unit 6 receives an exposure start instruction from the user, the imaging device initial position detecting unit 14 detects the position of the imaging device 1 at that time (initial position). Once the initial position is detected, the imaging device position resetting unit 19 shifts the imaging device 1 to a predetermined end position, such as the nearest end or the farthest end. The imaging device position resetting unit 19 resets the imaging device 1, and at the same time, the exposure time determining unit 8 determines capturing parameters including a shutter speed and an f-number. As soon as the above operations end, the synchronization managing unit 16 gives an instruction to start exposure to the imaging device shift control unit 17 and the shutter operation instructing unit 5. Simultaneously, the synchronization managing unit 16 gives an instruction to the imaging device shift control unit 17 so that, within the exposure time and based on the end point of imaging device 1 reset by imaging device position resetting unit 19, the imaging device shift control unit 17 shifts the imaging device 1 (i) from the nearest end to the farthest end when the end point is at the nearest end, and (ii) from the farthest end to the nearest end when the end point is at the farthest end. It is noted that the imaging device 1 shifts at a constant speed.

CITATION LIST

Patent Literature

[PTL 1] DE2301800 (West Germany Patent: Filed Jan. 15, 1973)
[PTL 2] Japanese Examined Patent Application Publication No. 05-27084
[PTL 3] Japanese Patent No. 3191928
[PTL 4] US 2008/0013941
[PTL 5] Japanese Patent No. 308413

Non Patent Literature

[NPL 1] E. R. Dowski and W. T. Cathey, "Extended depth of field through wave-front coding", Applied Optics, Vol. 34, No. 11, pp. 1859-1866 (1995).
[NPL 2] A. Levin, R. Fergus, F. Durand and W. T. Freeman, "Image and Depth from a Conventional Camera with a Coded Aperture", ACM Transactions on Graphics, Vol. 26, No. 3, Article 70, 70-1-70-9 (2007).
[NPL 3] H. Nagahara, S. Kuthirummal, C. Zhou and S. Nayar, "Flexible Depth of Field Photography", European Conference on Computer Vision (ECCV), Oct. 16th, Morning Session 2: Computational Photography (2008).
[NPL 4] C. Tisse, H. P. Nguyen, R. Tesieres, M. Pyanet and F. Guichard, "Extended Depth-of-field (EDOF) using sharpness transport across colour channels", Optical Engineering+Applications, Part of SPIE Optics+Photonics, Session 1—Imaging in the Optical Design Process: Depth of Field (2008).
[NPL 5] W. Chi and N. George, "Computational imaging with the logarithmic asphere: theory", Optical Society of America, Vol. 20, No. 12, December (2003).
[NPL 6] Y. Takahashi and S. Komatsu, "Optimized free-form phase mask for extension of depth of field in wavefront-coded imaging", Optical Society of America, Optics Letters, Vol. 33, No. 13, Jul. 1, (2008).
[NPL 7] Y. Takahashi, R. Obana, and S. Komatsu, "Optimized phase mask for wave-front coding: Extended DOF in off axis field", Optics and Photonics Japan 2007, Extended Abstracts, pp. 464-465 (27p C2), (2007).

SUMMARY OF INVENTION

Technical Problem

As described above, the F-DOF is most promising among various EDOF techniques for digital still cameras and digital video cameras. When a digital camera captures a moving picture, the moving picture needs to be continuously captured with no time-lag between frames. As shown in FIG. 6, the F-DOF technique makes the focus lens or the imaging device reciprocally shift, and alternately assigns each of an outward shift and an inward shift of the focus lens or the imaging device to each one video frame. Hence the F-DOF technique makes possible capturing a moving EDOF image.

However, the imaging device shift pattern or the focus lens shift pattern shown in FIG. 6 has a quick turn-around at the nearest end and the farthest end, which makes it difficult to put the control technique to practical use. In order to enable such a quick turn-around, the driving unit of the imaging device or the focus lens has to generate momentary large torque. In view of the needs of smaller and further power-saving devices, such torque-dependent shift control is not practical for portable digital still cameras and digital video cameras. In addition, the shift control severely wears the driving unit, which is not acceptable quality-wise.

Further discussed is the sharpness of the image obtained in the shift shown in FIGS. 3 and 6. FIG. 7 schematically shows the depth of field in regular image capturing; that is, the range of focus. This is referred to as the through focal characteristics. The ordinate shows the sharpness (sharpness of image). Typically, the sharpness is expressed in modulation transfer function (MTF). The abscissa shows the image-space distance. When the abscissa is inverted and rescaled based on the relationship shown in FIG. 5, an object-space to distance is obtained. Consider the case of the regular image capturing which requires no shifting during the exposure. In general, focusing to an object-space distance makes the focused point sharpest. Accordingly, an object in the foreground and the background in the object-space distance becomes out of focus as the object leaves the focal point.

FIG. 8 schematically shows through focal characteristics when the shift is carried out at a constant speed during the exposure as shown in FIG. 3. Each of the dotted lines shows the through focal characteristics in the regular image capturing shown in the schematic view of FIG. 7. Here the through focal characteristics are shifted from the farthest end to the nearest end. The solid line shows the through focal characteristics obtained from the result of the shift. According to Non Patent Literature 3, for example, the through focal characteristics in the solid line are obtained by the integral of the dotted lines. The schematic view shows the following: When the image-space distance shifts from the farthest end to the nearest end, the ends show less sharpness than the center part shows. This phenomenon is caused due to the reason below. At the center part, obtained is the sum of the dotted lines focused at center part and the dotted lines focused on the foreground and on the background of the center part. At each end, in contrast, obtained is the sum of only the dotted lines focused at the end and the dotted lines focused on one of the foreground and the background of either end. This is because the shift discontinues at each end. Accordingly, the conventional shifting technique in FIG. 6 has a problem in that the quality of the image to be restored at the farthest end and the nearest end is inferior to the quality of the image to be restored at the center part.

The present invention is conceived in view of the above problems and has an object to provide an imaging apparatus which is capable of reducing quality deterioration of a restored image at the farthest and the nearest ends in the F-DOF, and a control method thereof.

Solution to Problem

In order to solve the above problems, an imaging apparatus according to an aspect of the present invention includes: an imaging device; a lens which forms an image and collects light on the imaging device; a shift control unit which shifts an object-space focal point of the imaging apparatus by shifting an image-space distance between the imaging device and the lens; an exposure time determining unit which determines an exposure time based on an imaging scene; and a shift pattern determining unit which determines a shift pattern of the image-space distance, such that the focal point moves from one end to an other end of a predetermined range of focus during an exposure period of which duration is the exposure time, the image-space distance being shifted by the shift control unit, and the shift pattern being found in a frame period including the exposure period wherein the shift pattern determining unit determines the shift pattern such that: a shift speed of the image-space distance increases from zero during an acceleration period included in the frame period; the image-space distance shifts at a constant speed during a constant speed period included in the frame period and following the acceleration period; and the shift speed of the image-space distance decreases to zero during a deceleration period included in the frame period and following the constant speed period, and each of the acceleration period and the deceleration period has a duration equal to or longer than one-tenth of the frame period.

Due to the above structure, the imaging apparatus according to the aspect of the present invention does not have to make a quick change of the image-space distance shift, in using the F-DOF, between an exposure period in one frame period and an exposure period in the following frame period. Furthermore, the imaging apparatus according to the aspect of the present invention successfully makes the image sharpness at the farthest end and the nearest end (one end and the other end) of the range of focus close to the sharpness in the middle of the range. Thus, in the F-DOF, the imaging apparatus according to the aspect of the present invention can reduce quality deterioration of the restored image at the farthest end and the nearest end. Hence the imaging apparatus according to the aspect of the present invention can make uniform the sharpness of the image found within the range of focus, which contributes to generating a high-quality EDOF image.

The duration of each of the acceleration period and the deceleration period may be equal to or shorter than one-fourth of the frame period.

Due to the structure, the imaging apparatus according to an aspect of the present invention successfully reduces quality deterioration of the restored image in the center part.

The shift pattern determining unit may determine the shift pattern such that: the shift speed of the image-space distance increases at constant acceleration during the acceleration period; and the shift speed of the image-space distance decreases at constant deceleration during the deceleration period.

Due to the structure, the imaging apparatus according to the aspect of the present invention successfully achieves a mechanism to shift the focal point based on the shift pattern.

The frame period may include the exposure period, a first non-exposure period preceding the exposure period, and a second non-exposure period following the exposure period, at least part of the acceleration period may be included in the first non-exposure period, and at least part of the deceleration period may be included in the second non-exposure period.

Due to the structure, the imaging apparatus according to an aspect of the present invention successfully obtains an EDOF restored-image having uniform image quality within the range of focus.

The shift control unit may shift the image-space distance by moving a position of the lens.

Due to the above structure, the imaging apparatus according to an aspect of the present invention does not have to make a quick change of the focus lens shift, in using the F-DOF, between an exposure period in one frame period and an exposure period in the following frame period.

The shift control unit may shift the image-space distance by moving a position of the imaging device.

Due to the above structure, the imaging apparatus according to an aspect of the present invention successfully shifts the focal point by shifting the imaging device.

The imaging apparatus may further include: a Point Spread Function (PSF) storage unit which stores in advance a restoration PSF; an image-restoration processing unit which carries out image-restoration processing on image data generated by the imaging device, using the restoration PSF; and an image data recording unit which records an image restored by the image-restoration processing unit.

It is noted that the present invention can provide an imaging apparatus control method employing, as steps, the characteristic units included in the imaging apparatus, and a program to cause a computer to execute the characteristic steps. Obviously, such a program can be distributed via a non-transitory computer-readable recording medium such as a CD-ROM, and a transmission medium such as the Internet.

Furthermore, the present invention can provide a large-scale integration (LSI) which carries out some of the functions of the imaging apparatus.

Advantageous Effects of Invention

The present invention provides an imaging apparatus which is capable of reducing quality deterioration of a restored image at the farthest and the nearest ends in the F-DOF, and a control method thereof.

DESCRIPTION OF EMBODIMENTS

Described hereinafter are Embodiments of the present invention with reference to the drawings.

Embodiment 1

Employing the F-DOF technique, an imaging apparatus according to Embodiment 1 of the present invention decelerates or accelerates a shift speed of the image-space distance at an end of the range of focus. Thus, in the shifting, the imaging apparatus does not have to make the image-space distance quickly change at the end of the range of focus. Furthermore, at the end of the range of focus, the imaging apparatus successfully makes image sharpness close to the sharpness in the middle of the range. Hence, in the F-DOF, the imaging apparatus can reduce quality deterioration of the restored image found at the farthest end and the nearest end.

Described is the imaging apparatus according to Embodiment 1 of the present invention with reference to FIGS. 9 to 19.

First, a schematic structure of the imaging apparatus according to Embodiment 1 of the present invention is described.

Figure 9:
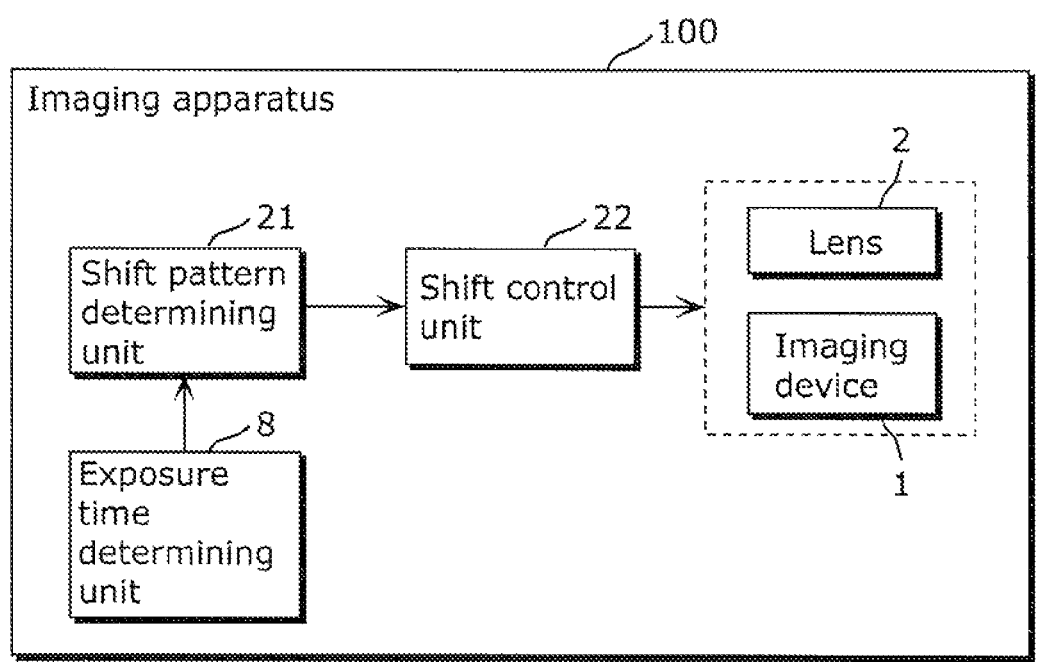
FIG. 9 depicts a block diagram of an imaging apparatus according to Embodiment 1 of the present invention.

FIG. 9 schematically shows an imaging apparatus 100 according to Embodiment 1 of the present invention.

The imaging apparatus 100 in FIG. 9 includes the exposure time determining unit 8, a shift pattern determining unit 21, a shift control unit 22, the imaging device 1, and the lens 2.

The lens 2 forms an image and collects light on the imaging device 1.

The shift control unit 22 shifts the object-space focal point (object-space distance u) of the imaging apparatus 100 by shifting a relative distance (image-space distance v) between the imaging device 1 and the lens 2. It is noted that the object-space focal point may simply be referred to as the focal point.

The exposure time determining unit 8 determines an exposure time based on an image scene.

Figure 10:
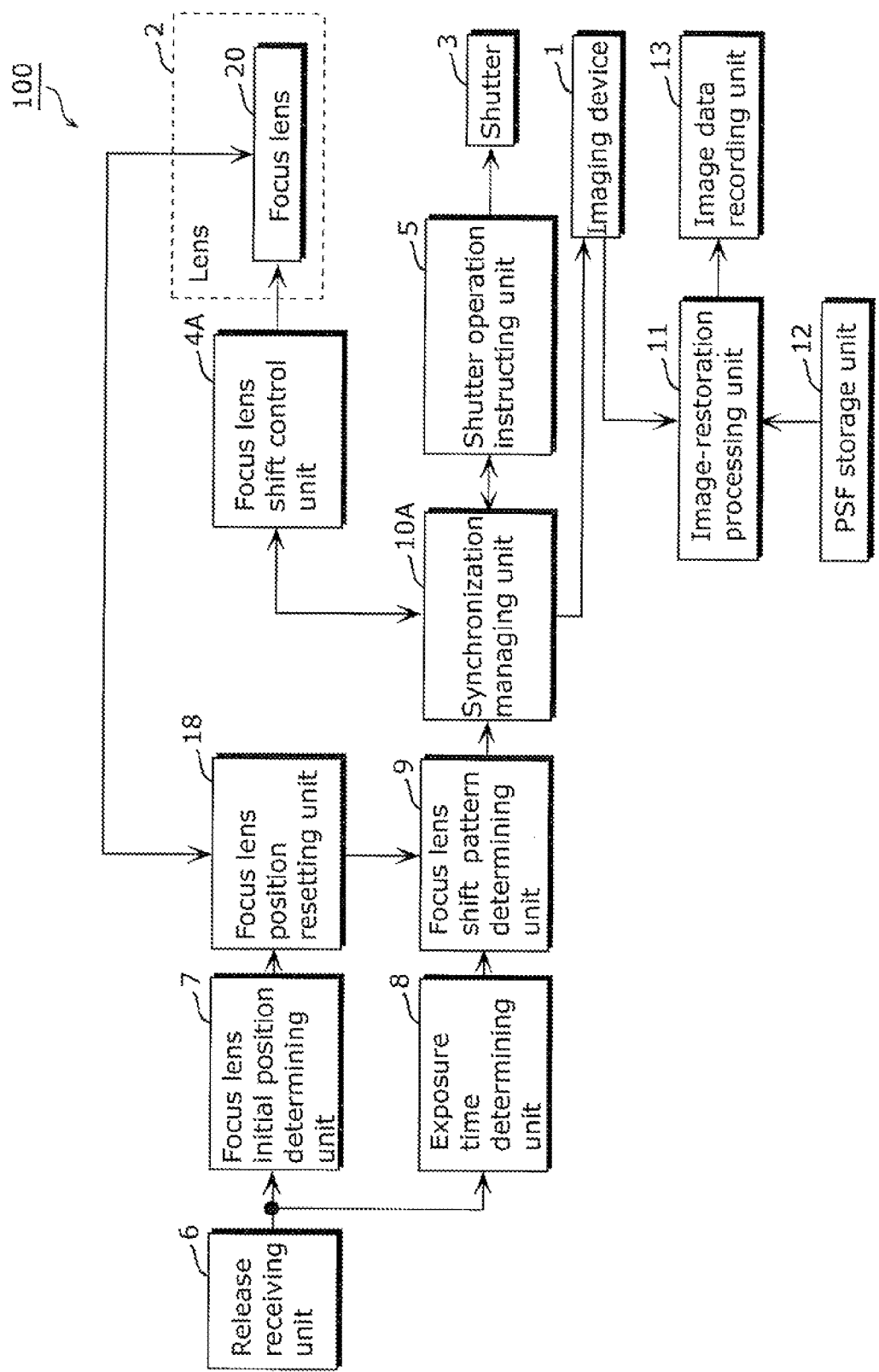
FIG. 10 depicts a block diagram of the imaging apparatus according to Embodiment 1 of the present invention.

FIG. 10 shows in detail the imaging apparatus 100 according to Embodiment 1 of the present invention. As shown in FIG. 10, the imaging apparatus 100 includes the imaging device 1, the lens 2, the shutter 3, a focus lens shift control unit 4A, the shutter operation instructing unit 5, the release receiving unit 6, the focus lens initial position detecting unit 7, the exposure time determining unit 8, a focus lens shift pattern determining unit 9, a synchronization managing unit 10A, the image-restoration processing unit 11, the PSF storage unit 12, the image data recording unit 13, and the focus lens position resetting unit 18.

The focus lens shift control unit 4A is a specific example of the shift control unit 22 in FIG. 9. The focus lens shift control unit 4A moves the position of the focus lens 20 to shift the focal point.

Moreover, the focus lens shift pattern determining unit 9 is a specific example of the shift pattern determining unit 21 in FIG. 9.

The shutter 3 physically starts and ends the exposure to the imaging device 1. The shutter operation instructing unit 5 instructs the shutter 3 to open and close.

When the shutter 3 opens and the lens 2 forms an optical image of the object on the imaging device 1, the formed optical image is converted to an electric signal by the imaging device 1. It is noted that the lens 2 typically includes the focus lens 20 and a group of lenses other than the focus lens 20 such that a desired object is focused in optical image forming. The focus lens 20 may include two or more lenses. The focus lens 20 is capable of shifting a relative position to the group of lenses. Such a shift of the relative position shifts the focal point.

The release receiving unit 6 receives an exposure start instruction (instruction to release the shutter) from the user.

Upon receiving an exposure start instruction from the user, the focus lens initial position detecting unit 7 detects the position of the focus lens 20 at that time (the initial position).

Once the focus lens initial position detecting unit 7 detects the initial position, the focus lens position resetting unit 18 resets the position of the focus lens 20 based on the initial position. Specifically, the focus lens position resetting unit 18 shifts the position of the focus lens 20 to a predetermined end position, such as the nearest end or the farthest end. Here, in a predetermined range of focus and with respect to the imaging apparatus 100, the nearest end is at the nearest distance to the imaging apparatus 100, and the farthest end is at the farthest distance from the imaging apparatus 100.

When the release receiving unit 6 receives the instruction to release the shutter, the exposure time determining unit 8 immediately determines the exposure time based on the image scene. The focus lens position resetting unit 18 resets the focus lens 20, and at the same time, the exposure time determining unit 8 determines capturing parameters including a shutter speed and an f-number.

When the focus lens position resetting unit 18 finishes resetting the position of the focus lens, the focus lens shift pattern determining unit 9 determines a shift pattern of the relative distance between the focus lens 20 and the imaging device 1; that is a shift pattern of the image-space distance v, such that the focal point moves from one end to the other end of a predetermined range of focus during the exposure period whose duration is the exposure time. Here, the image-space distance v is shifted by the shift control unit 22, and the shift pattern is found in a frame period including the exposure period. For example, the focus lens shift pattern determining unit 9 determines the shift pattern shown in FIG. 11.

Here a frame period is a one video frame period in capturing a moving picture or a capturing time of a single still picture based on a requested sequential capturing speed in sequentially capturing still pictures.

Upon determining the shift pattern of the image-space distance v, the focus lens shift pattern determining unit 9 determines a shift pattern of the focus lens 20 in conformity with the shift pattern of the image-space distance v, and notifies the synchronization managing unit 10A of the determined shift pattern of the focus lens 20. Based on the determined shift pattern of the focus lens 20, the synchronization managing unit 10A manages to synchronize the start and the end of the exposure with the operations of the focus lens shift control unit 4A and the shutter operation instructing unit 5.

Specifically, as soon as detecting the facts that the focus lens shift pattern determining unit 9 determines the shift pattern of the focus lens 20 and the exposure time determining unit 8 determines the exposure time, the synchronization managing unit 10A immediately gives an exposure start instruction to the focus lens shift control unit 4A and the shutter operation instructing unit 5.

Upon receiving the exposure start instruction, the shutter operation instructing unit 5 causes the shutter 3 to open. After the exposure time elapses, the synchronization managing unit 10A instructs (i) the focus lens shift control unit 4A to end the shift of the focus lens 20, and (ii) the shutter operation instructing unit 5 to end the exposure. On receiving the exposure end instruction, the shutter operation instructing unit 5 causes the shutter 3 to close.

When the optical image of the object is formed on the imaging device 1, the formed optical image is converted to an image signal; that is an electric signal, by the imaging device 1. The image signal is provided to the image-restoration processing unit 11. Simultaneously, the synchronization managing unit 10A notifies the image-restoration processing unit 11 that the exposure has ended, and the image has been captured employing the F-DOF-based focus shifting.

The PSF storage unit 12 stores in advance a restoration point spread function (PSF) in order to restore the image signal.

Upon receiving the image signal, the image-restoration processing unit 11 reads the restoration PSF stored in the PSF storage unit 12, and carries out image-restoration processing on the image signal using the restoration PSF. Specifically, the PSF storage unit 12 holds a previously-measured or simulation-obtained blur pattern caused by the focus shift. It is noted that various techniques are known for restoring an image, such as the Wiener Filter, and the Lucy-Richardson. Any technique may be usable.

The image data recording unit 13 records the restored image signal as image data.

Detailed hereinafter is the shift pattern determined by the focus lens shift pattern determining unit 9.

Figure 11:
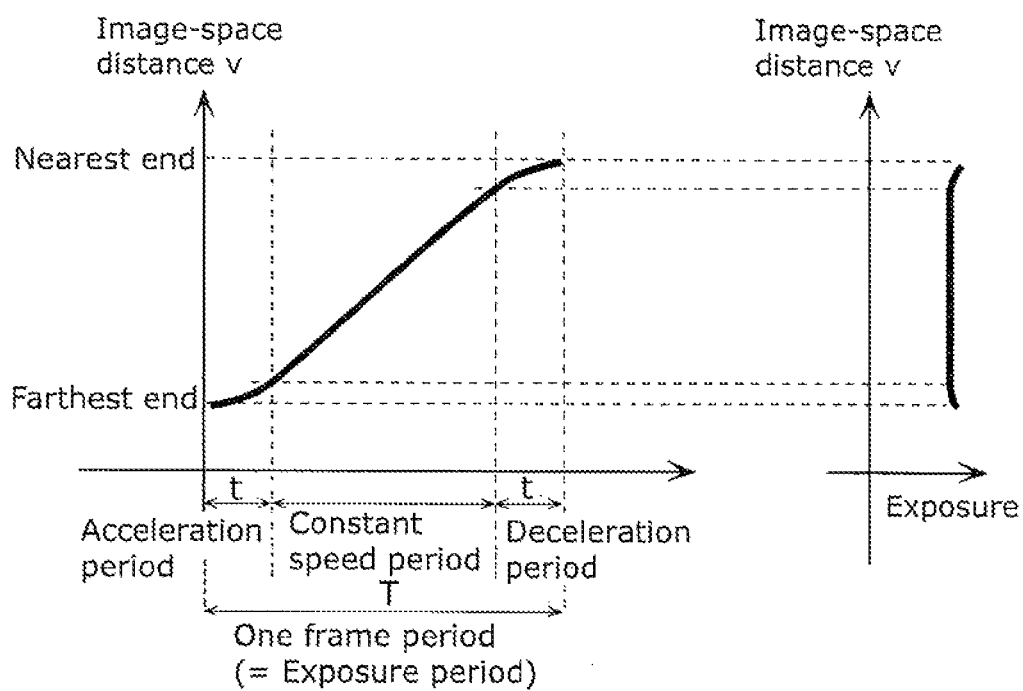
FIG. 11 exemplifies a shift pattern according to Embodiment 1 of the present invention.
Figure 12:
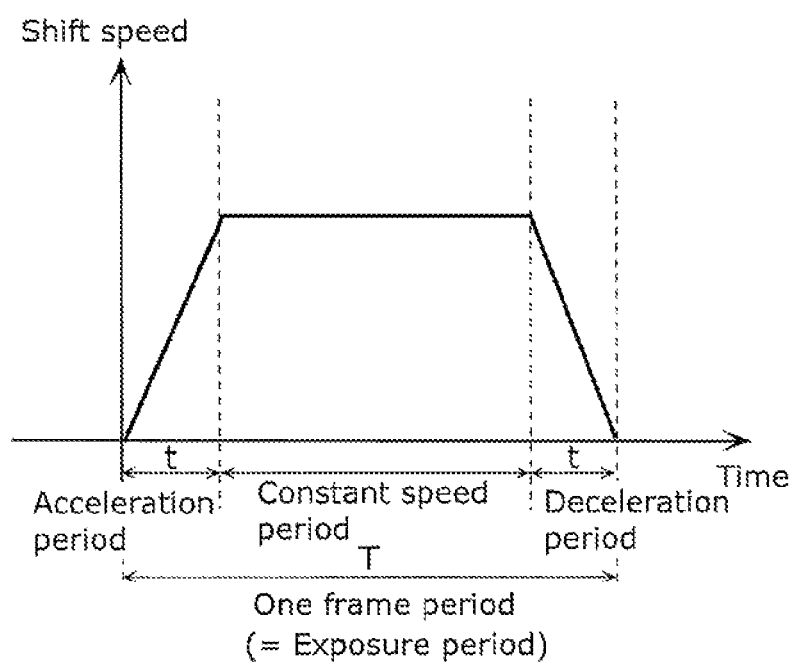
FIG. 12 exemplifies a shift speed according to Embodiment 1 of the present invention.

FIG. 11 exemplifies a shift pattern of the image-space distance v according to Embodiment 1 of the present invention. FIG. 12 shows a shift speed of the image-space distance v in this case.

Consider the case of capturing a moving image, for example. As shown in FIGS. 11 and 12, the shift time of the image-space distance v from the farthest end to the nearest end in the shift pattern is equal to the exposure time of a one video frame period (one frame period).

In addition, as shown in FIGS. 11 and 12, one frame period includes an acceleration period, followed by a constant speed period and a deceleration period.

During the acceleration period, the shift speed of the image-space distance v increases from zero at constant acceleration. During the constant speed period, the image-space distance v shifts at a constant speed. Then, during the deceleration period, the shift speed of the image-space distance v decreases to zero at the nearest end at constant deceleration. Hence the focus lens shift pattern determining unit 9 controls the shift pattern of the focus lens 20 in order to control the shift pattern of the image-space distance v.

Figure 5:
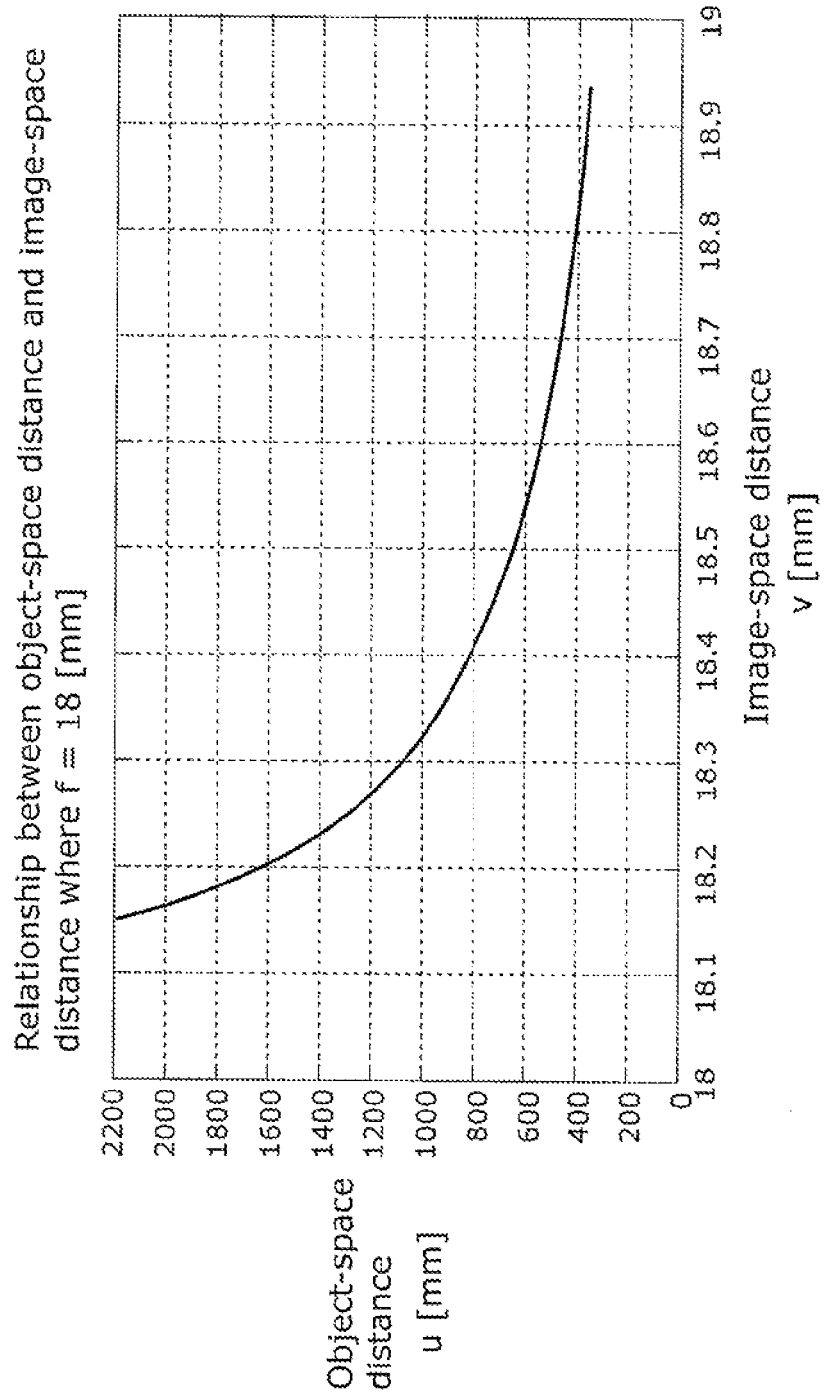
FIG. 5 exemplifies a relationship between the object-space distance and the image-space distance.
Figure 6:
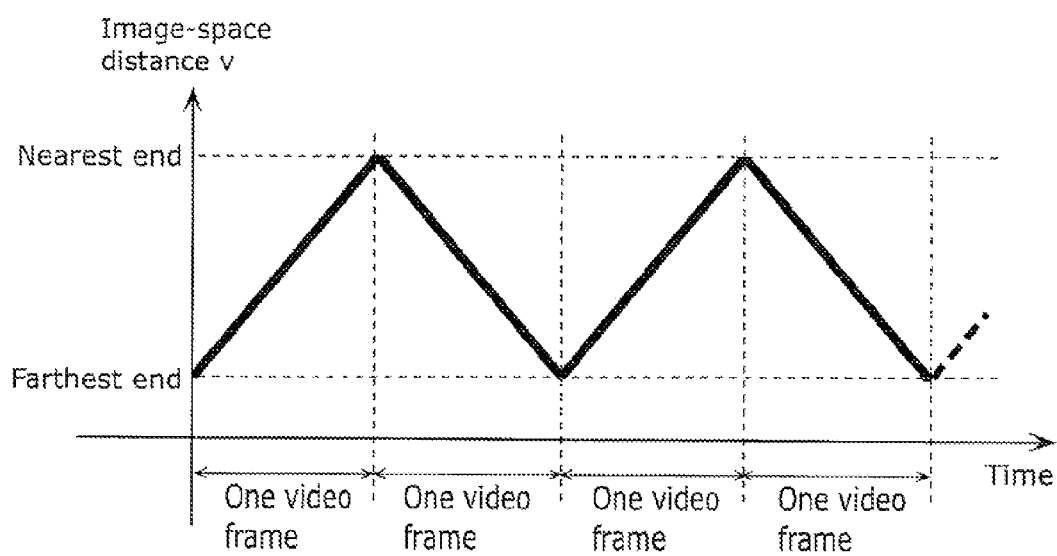
FIG. 6 exemplifies a shift pattern of the conventional imaging apparatus in capturing a moving image.
Figure 7:
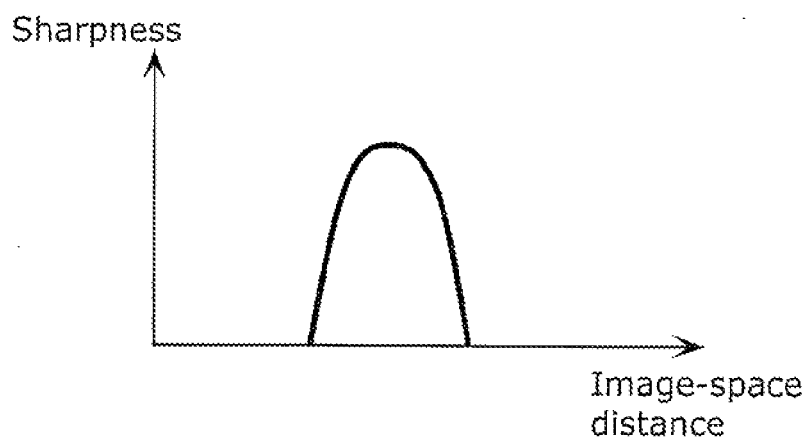
FIG. 7 shows through focal characteristics of a typical lens structure.
Figure 8:
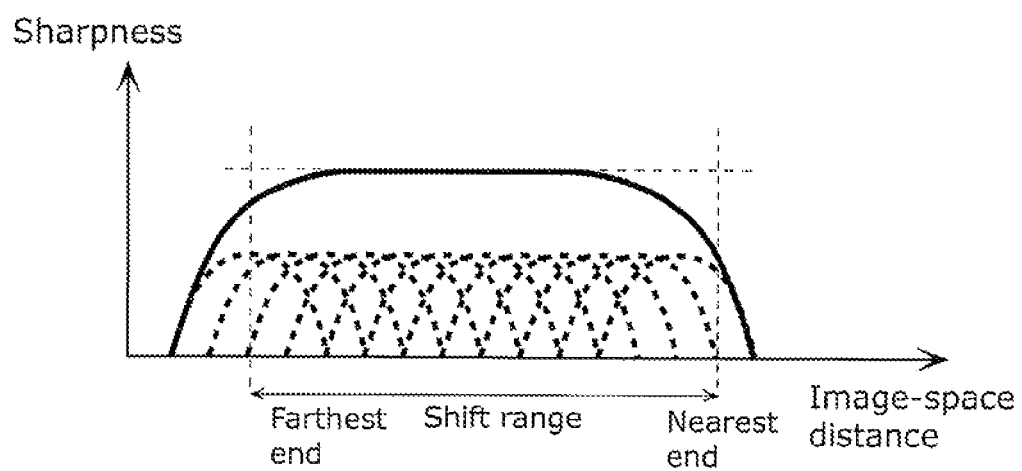
FIG. 8 shows through focal characteristics of a conventional F-DOF shift.

Obviously, the shift pattern may be applied based on the idea in FIG. 5, and the image-space distance v may be shifted from the nearest end to the farthest end in the exposure period of the next video frame. Repetition of such a shift makes possible capturing a moving image. For sequential capturing of still images, the technique for capturing a moving image may be used as well.

It is noted that the shift pattern during the exposure period for a one video frame is an example. Thus other shift patterns may be employed. Instead of the above-described shift pattern showing the shift in one-way, a similar effect is also observed when a shift pattern shows reciprocal shifts integer times followed by one-way shift within the exposure period in one frame, such as one reciprocal shift and a one-way shift and two reciprocal shifts and a one-way shift.

Furthermore, in the above description, the shift speed of the image-space distance v increases at a constant acceleration during the acceleration period; instead, the acceleration does not have to be constant. Moreover, in the above description, the shift speed of the image-space distance v decreases at a constant deceleration during the deceleration period; instead, the deceleration does not have to be constant. However, the constant acceleration and deceleration are desirable since they facilitate generation of the shift pattern.

Moreover, an acceleration/deceleration time t, showing the duration of each of the acceleration period and the deceleration period, is desirably equal to or longer than one tenth and is equal to or shorter than a quarter of one frame time T which is the duration of one frame period. The reason is described hereinafter.

Figure 13:
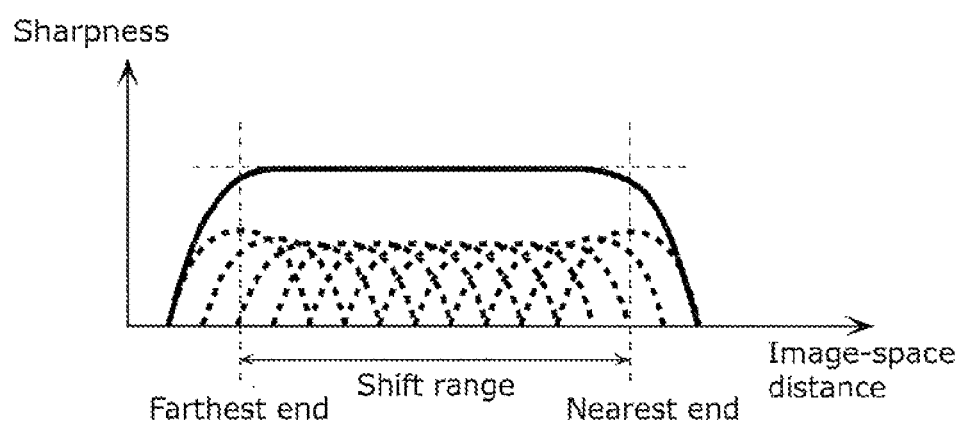
FIG. 13 exemplifies through focal characteristics according to Embodiment 1 of the present invention.

When the shift is made at a constant speed through the entire range of focus, the quality of the restored image slightly deteriorates at the ends of the range of focus. Concurrently, the use of the shift pattern according to Embodiment 1 of the present invention improves the quality of the restored image at the ends of the range of focus. FIG. 13 shows through focal characteristics observed when the shift pattern according to Embodiment 1 of the present invention is adopted. FIG. 13 shows that the image at the ends of the range of focus is sharper than the image at the center part, as the focal point stays longer at the ends than at the center part of the range of focus. As a result, the sharpness is uniform through a desired range of focus.

Figure 14A:
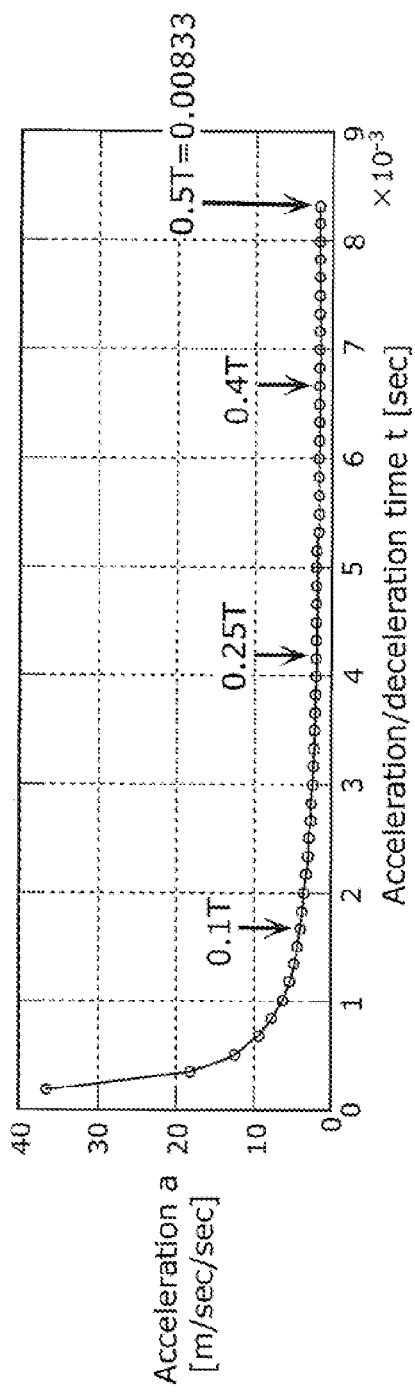
FIG. 14A shows a relationship between an acceleration/deceleration time and requested acceleration according to Embodiment 1 of the present invention.
Figure 14B:
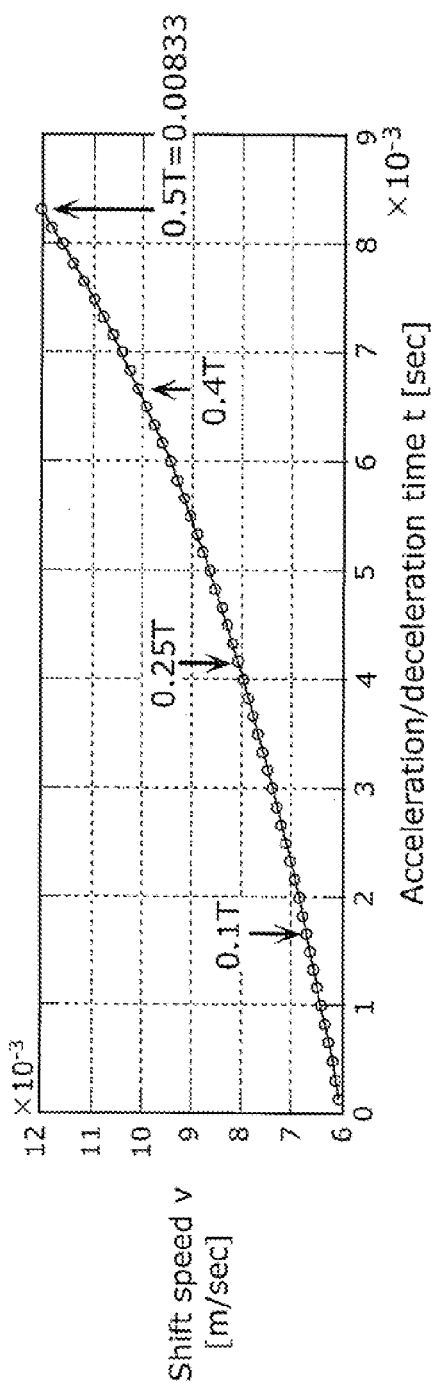
FIG. 14B shows a relationship between an acceleration/deceleration time and a shift speed at the center part according to Embodiment 1 of the present invention.

FIG. 14A is a graph showing a relationship between the acceleration/deceleration time t and the requested acceleration a, where the image-space shift distance is 100 μm, and a one frame time T is one-sixtieth second. FIG. 14B is a graph showing a relationship between the acceleration/deceleration time t and the shift speed v at the center part under the same condition.

Typically, the following relationships hold where an image-space shift distance is Sd, the one frame time is T, the acceleration/deceleration time is t, the requested acceleration at an end of the range of focus is a, and the shift speed in the center part is v:

$$a = \frac{Sd}{(T-t) \times t}, \quad \text{Expression 2}$$

$$v = \frac{Sd}{T-t}. \quad \text{Expression 3}$$

The abscissas in FIGS. 14A and 14B show the acceleration/deceleration time t. The ordinate in FIG. 14A show s the requested acceleration a. The ordinate in FIG. 14B shows the shift speed v in the center part.

As shown in FIG. 14A, a shorter acceleration/deceleration time t rapidly increases the requested acceleration a (deceleration) required at the ends of the range of focus. In other words, the shorter acceleration/deceleration time t requires very large acceleration, which makes the imaging apparatus impossible to be achieved.

Furthermore, when the acceleration/deceleration time t shown in FIG. 14B is longer, the shift speed v in the center part is faster. Specifically, a longer acceleration/deceleration time t makes the focal point stay longer at the ends, contributing to improvement in the restored image quality. At the same time, however, the shift speed v in the center part becomes inevitably fast. Because of the above problems, the entire sharpness including the one in the center part is expected to reduce. This means that a reduction in the MTF before the restoring process in the shift causes an increase in effect on the sharpness, such as the noise.

FIGS. 15A to 15D and FIGS. 16A to 16D are experiment data which specifically and quantitatively evaluates the above phenomena. Experiments were conducted under the following conditions: the focal length of 4.8 mm, the f-number of 2.8, the focal point of infinite distance, the wavelength of 550 nm. As the range of focus, the near limit is shifted to 0.48 m setting the infinite distance in the center. Here, the image-space distance shifts between 4.75 mm and 4.85 mm according to the Gaussian lens law.

Figure 15A:
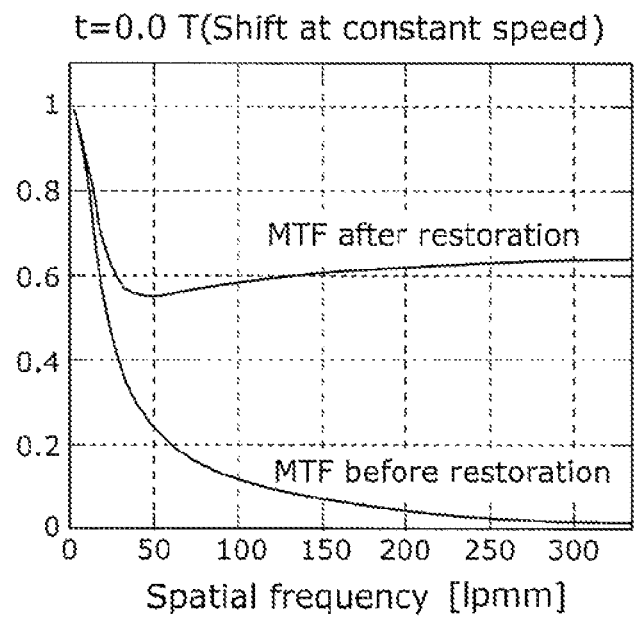
FIG. 15A shows an MTF observed at an end of a range of focus after restoration processing according to Embodiment 1 of the present invention.
Figure 15B:
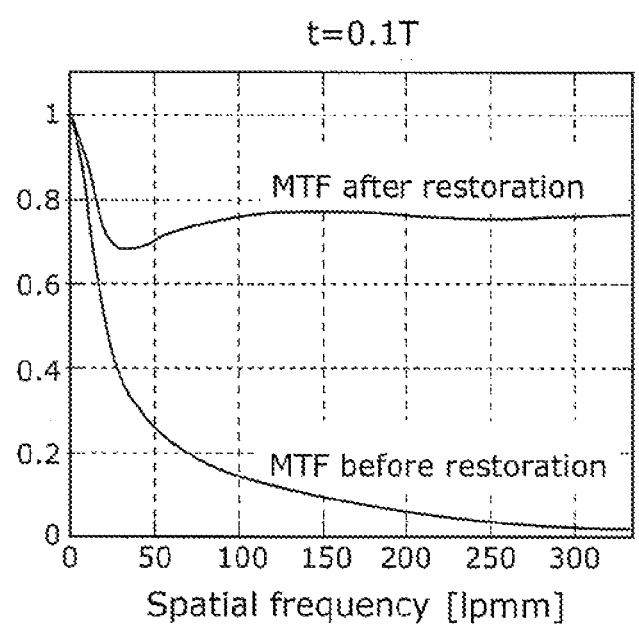
FIG. 15B shows an MTF observed at an end of a range of focus after restoration processing according to Embodiment 1 of the present invention.
Figure 15C:
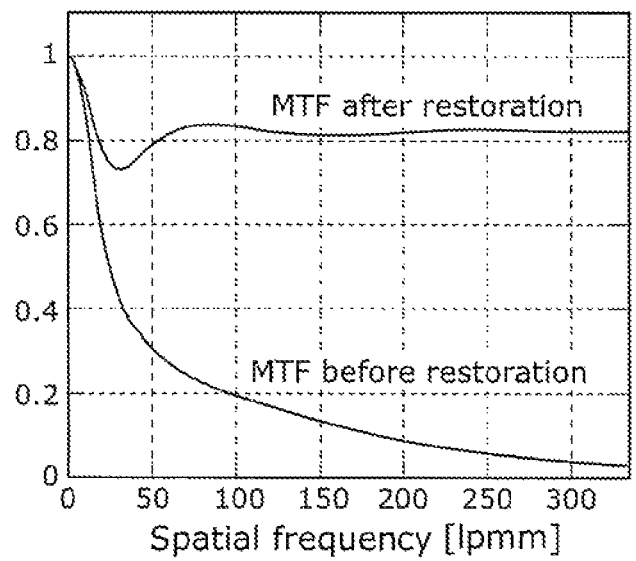
FIG. 15C shows an MTF observed at an end of a range of focus after restoration processing according to Embodiment 1 of the present invention.
Figure 15D:
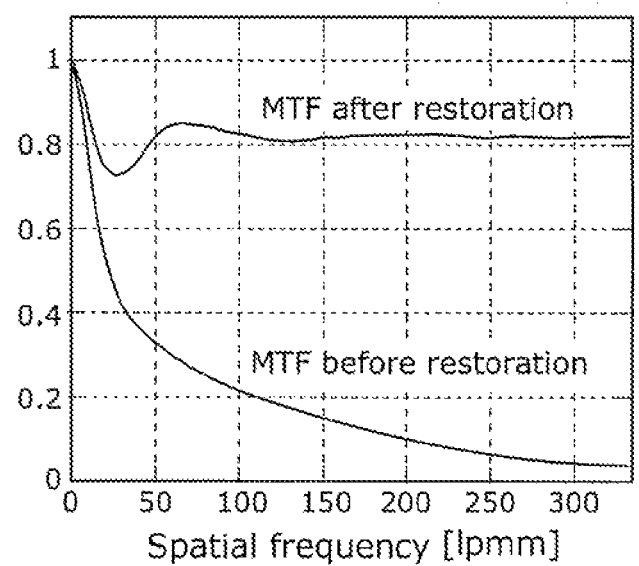
FIG. 15D shows an MTF observed at an end of a range of focus after restoration processing according to Embodiment 1 of the present invention.
Figure 16A:
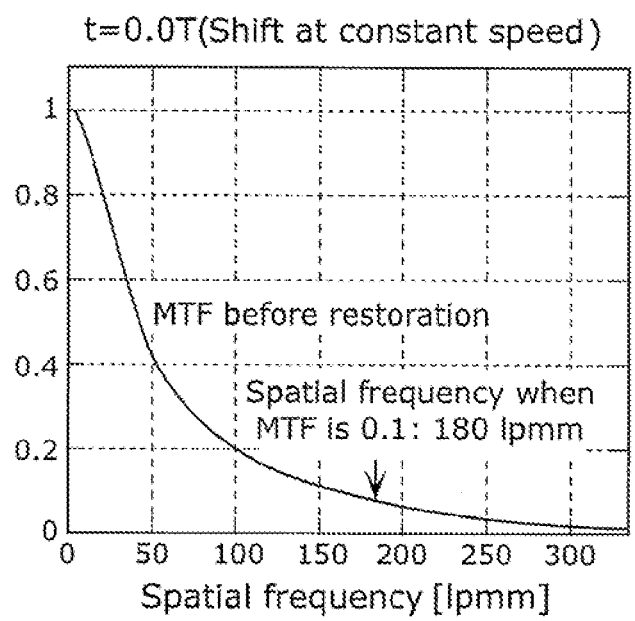
FIG. 16A shows an MTF observed at the center part of a range of focus before restoration processing according to Embodiment 1 of the present invention.
Figure 16B:
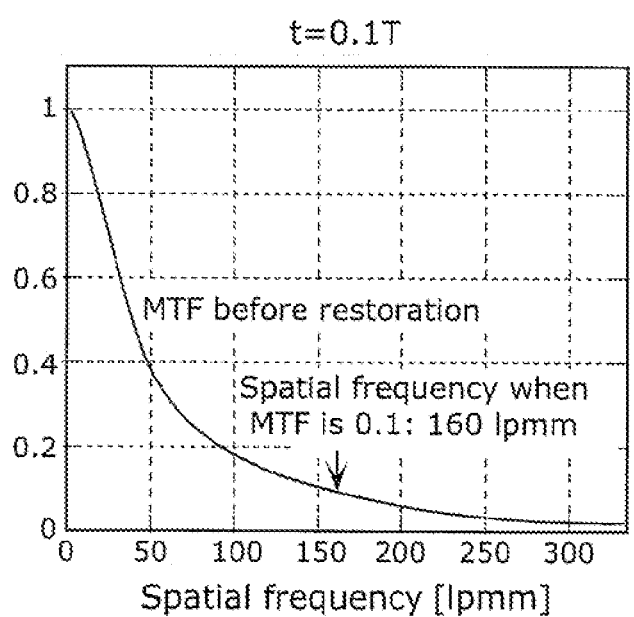
FIG. 16B shows an MTF observed at the center part of a range of focus before restoration processing according to Embodiment 1 of the present invention.
Figure 16C:
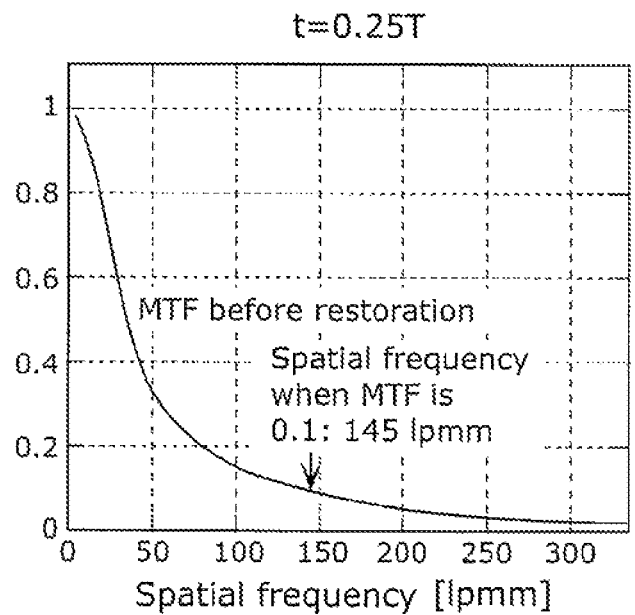
FIG. 16C shows an MTF observed at the center part of a range of focus before restoration processing according to Embodiment 1 of the present invention.
Figure 16D:
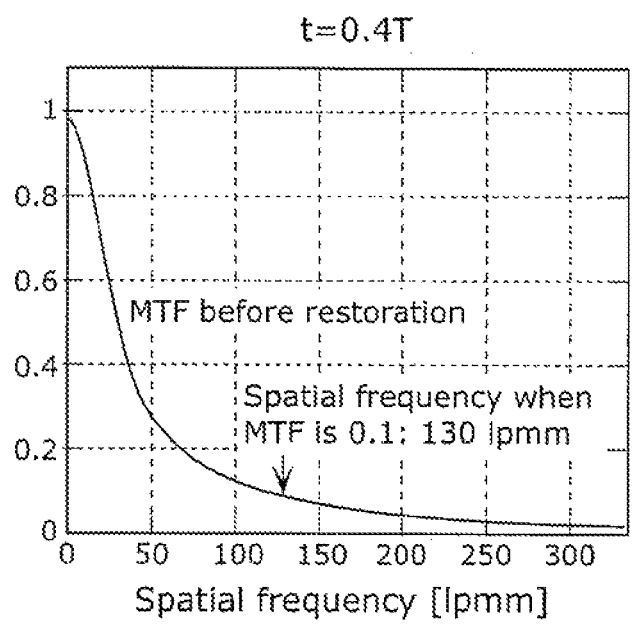
FIG. 16D shows an MTF observed at the center part of a range of focus before restoration processing according to Embodiment 1 of the present invention.

FIGS. 15A to 15B are the graphs showing MTFs before the restoration processing (MTFs of an image obtained by a simple shift) and MTFs after the restoration processing (PTFs obtained, as restoration PSFs, in the shift when the object is assumed in the infinite distance). Furthermore, FIG. 15A shows the case where t=0.0T (in other words, all of the shifts are at a constant speed). FIG. 15B shows the case where t=0.1T. FIG. 15C shows the case where t=0.25T. FIG. 15D shows the case where t=0.4T.

Note the MTFs of the ends after the restoration processing. In the case of the shift at the constant speed in FIG. 15A, the MTF after the restoration processing is approximately 0.6. In the case of t=0.1T in FIG. 15B, the MTF after the restoration processing is slightly smaller than 0.8. In the cases of t=0.25T in FIG. 15C and t=0.4T in FIG. 15D, the MTFs after the restoration processing are slightly greater than 0.8. Moreover, the MTFs at the ends do not increase even though t becomes greater than 0.25T.

In other words, FIGS. 15A to 15D show that having the acceleration period and the deceleration period improves the sharpness at the ends. Furthermore, a longer acceleration/deceleration time t to some degree improves the sharpness at the ends. However, once the acceleration/deceleration time t lasts longer than a certain level, the sharpness at the ends will not change much (shows little improvement in the sharpness).

FIGS. 16A to 16D show MTF characteristics at the infinite distance position (namely, the center part of the EDOF) before the restoration processing. Note the spatial frequency when the MTF value is 0.1, for example. In the case of t=0.0T (namely, the shift at a constant speed) in FIG. 16A, the spatial frequency is approximately 180 lpmm. In the case of t=0.1T in FIG. 16B, the spatial frequency is approximately 160 lpmm. In the case of t=0.25T in FIG. 16C, the spatial frequency is approximately 145 lpmm. In the case of t=0.4T in FIG. 16D, the spatial frequency is approximately 130 lpmm.

As expected above, when a longer acceleration/deceleration time t makes the focal point stay longer at the ends, the shift speed in the center part increases and the MTF in the center part comparatively decreases. Hence, when the acceleration/deceleration time t increases, the image data is susceptible to the noise, and quality of the restored image highly likely deteriorates in the image-restoration processing. Therefore, in Embodiment 1 of the present invention, the acceleration/deceleration time t is limited between 0.1 and 0.25 for one frame time (exposure time) T.

It is noted that the acceleration/deceleration time t is set to at least equal to or longer than one-tenth of the one frame time T, so that the quality of the restored image at the farthest end and the nearest end can be improved. In addition, the acceleration/deceleration time t is set to equal to or shorter than one-fourth of the one frame time T, so that the quality deterioration of the restored image in the center part can be reduced.

Furthermore, the durations of the acceleration period and the deceleration period may be either the same or different. In other words, the acceleration in the acceleration period may be different from the deceleration in the deceleration period.

Moreover, exemplified above is the case where the one frame period and the exposure period are the same in duration. Instead, the one frame period may include the exposure period and a non-exposure period. This is the case where the exposure time; that is either the exposure time of one video frame determined or the exposure time for a single still picture in sequentially capturing still pictures, is shorter than either a video frame rate (one-thirtieth or one-sixtieth) or a capturing time of a single still picture based on a requested sequential capturing speed. Here, considered is the case where the shift pattern in FIG. 11 shows that the shift speed is zero at the ends in the non-exposure time, and the focal point does not shift at the ends.

Figure 17:
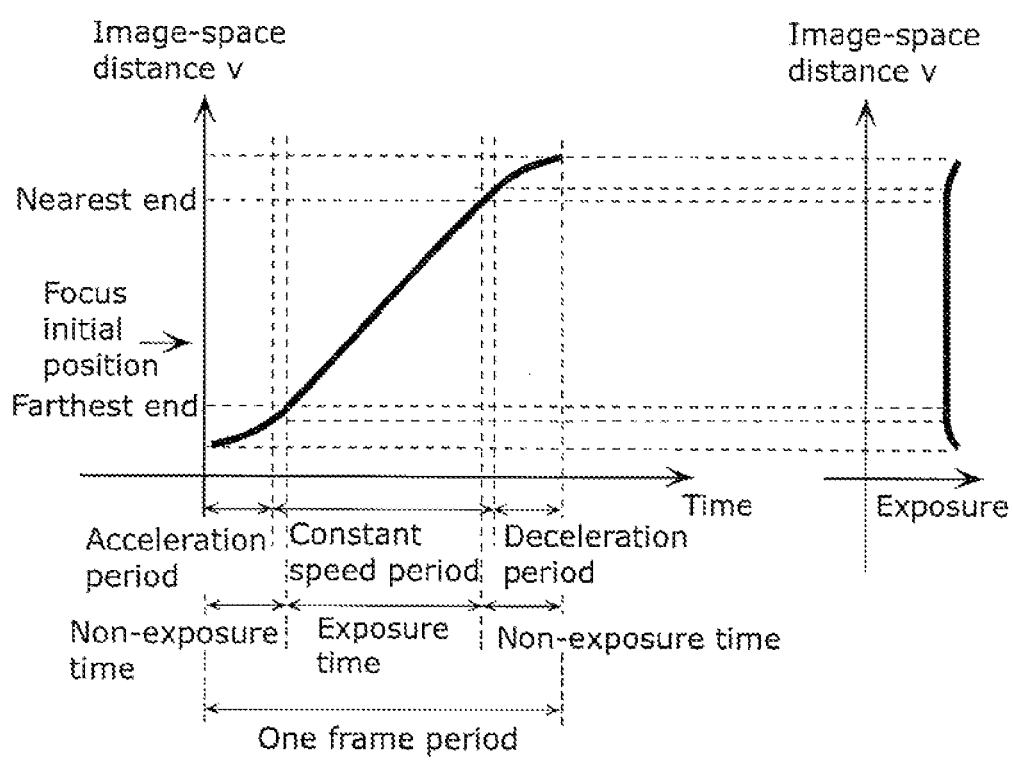
FIG. 17 shows a modification of the shift pattern according to Embodiment 1 of the present invention.

Moreover, as shown in FIG. 17, also considered is the case where the focal point is shifted greater by a predetermined amount than an actually-required shift amount (the distance between the farthest end and the nearest end), so that the focus lens 20 is caused to at a constant speed within the range of the requested shift amount (the distance between the farthest end and the nearest end). In this case, instead of causing the focus lens 20 at the speed of zero to stay at the ends, the acceleration/deceleration time is caused to be included in the non-exposure time. In other words, the acceleration period may be included in the non-exposure period which is included in the one frame period and is provided before the exposure period. The deceleration period may be included in the non-exposure period which is included in the one frame period and is provided after the exposure period. This operation makes possible obtaining uniform EDOF restoration processing image quality within the range of a desired shift amount (the distance between the farthest end and the nearest end). It is noted that part of the acceleration period may be included in the non-exposure period, and the other part of the acceleration period may be included in the exposure period. Similarly, part of the deceleration period may be included in the non-exposure period, and the other part of the deceleration period may be included in the exposure period.

Figure 18:
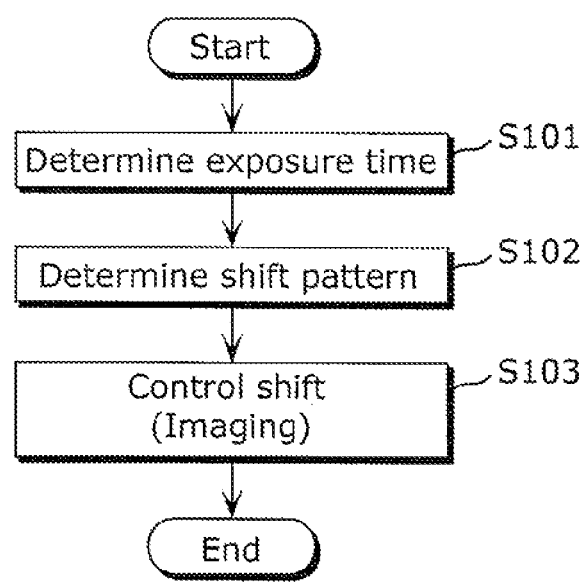
FIG. 18 depicts a flowchart of an imaging operation carried out by the imaging apparatus according to Embodiment 1 of the present invention.

Described hereinafter is a flow of an operation on the imaging apparatus 100. FIG. 18 is a flowchart of an imaging operation carried out by the imaging apparatus 100.

First, the exposure time determining unit 8 determines an exposure time based on an image scene (S101).

Then, the focus lens shift pattern determining unit 9 determines a shift pattern of the image-space distance during the frame period including the exposure period, so that the focal point moves from one end to the other end of a predetermined range of focus during the exposure period determined in Step S101 (S102).

Upon determining the shift pattern of the image-space distance, the focus lens shift pattern determining unit 9 determines a shift pattern of the focus lens 20 in conformity with the shift pattern of the image-space distance, and notifies the synchronization managing unit 10A of the shift pattern of the focus lens 20. Based on the shift pattern of the focus lens 20, the synchronization managing unit 10A manages to synchronize the start and the end of the exposure with the operations of the focus lens shift control unit 4A and the shutter operation instructing unit 5. Hence the focus lens shift control unit 4A shifts the image-space distance within one frame period as the to shift pattern determined in Step S102 (S103).

As described above, the imaging apparatus 100 according to Embodiment 1 of the present invention carries out such control in order to capture a moving picture and sequential still pictures employing the EDOF adopting the F-DOF. At the same time, the imaging apparatus 100 according to Embodiment 1 of the present invention successfully achieves an improvement in image quality at the ends of the range of focus.

It is noted that the imaging apparatus 100 of the present invention does not have to include all the processing units shown in FIG. 10.

Figure 19:
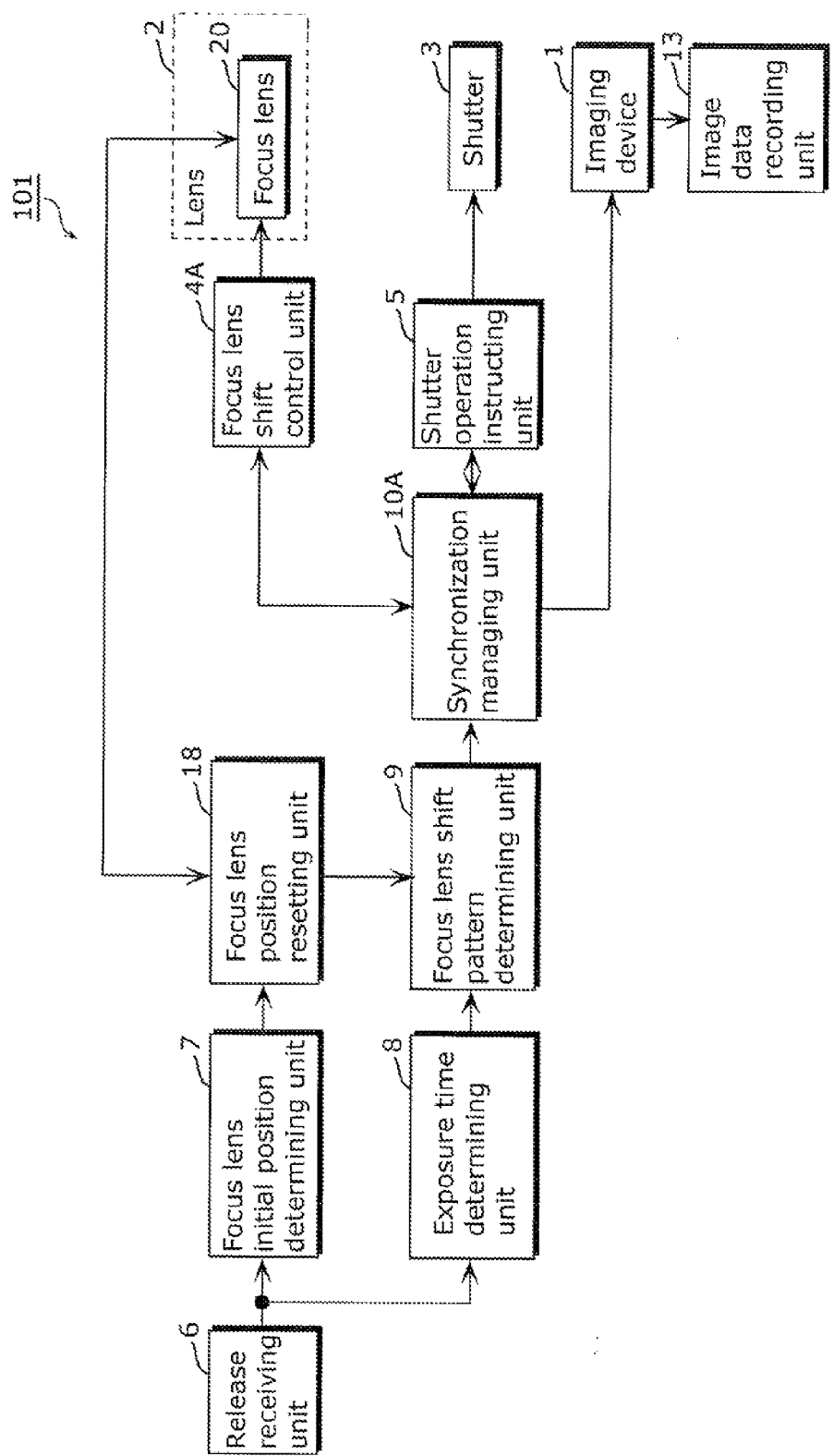
FIG. 19 depicts a modification of the block diagram of the imaging apparatus according to Embodiment 1 of the present invention.

FIG. 19 is a block diagram of an imaging apparatus 101 which is a modification of the imaging apparatus 100 according to Embodiment 1. The structure and effects of the imaging apparatus 101 are similar to those of the imaging apparatus 100 shown in FIG. 10. Compared with the imaging apparatus 100 in FIG. 10, the imaging apparatus 101 is characterized by directly recording, on the image data recording unit 13, an image obtained through the exposure. This structure intends to achieve the image-restoration processing to be executed not in the imaging apparatus but on an external apparatus, such as a personal computer, an image viewer, or a network server. Hence, compared with the structure of the imaging apparatus 100 in FIG. 10, the imaging apparatus 101 can significantly reduce a shutter time lag while reducing a calculation amount of the imaging apparatus.

Embodiment 2

Embodiment 2 of the present invention exemplifies a shift of the focal point by way of moving the position of the imaging device 1. Furthermore, the schematic structure of an imaging apparatus 200 according to Embodiment 2 of the present invention is similar to that shown in FIG. 9.

Figure 20:
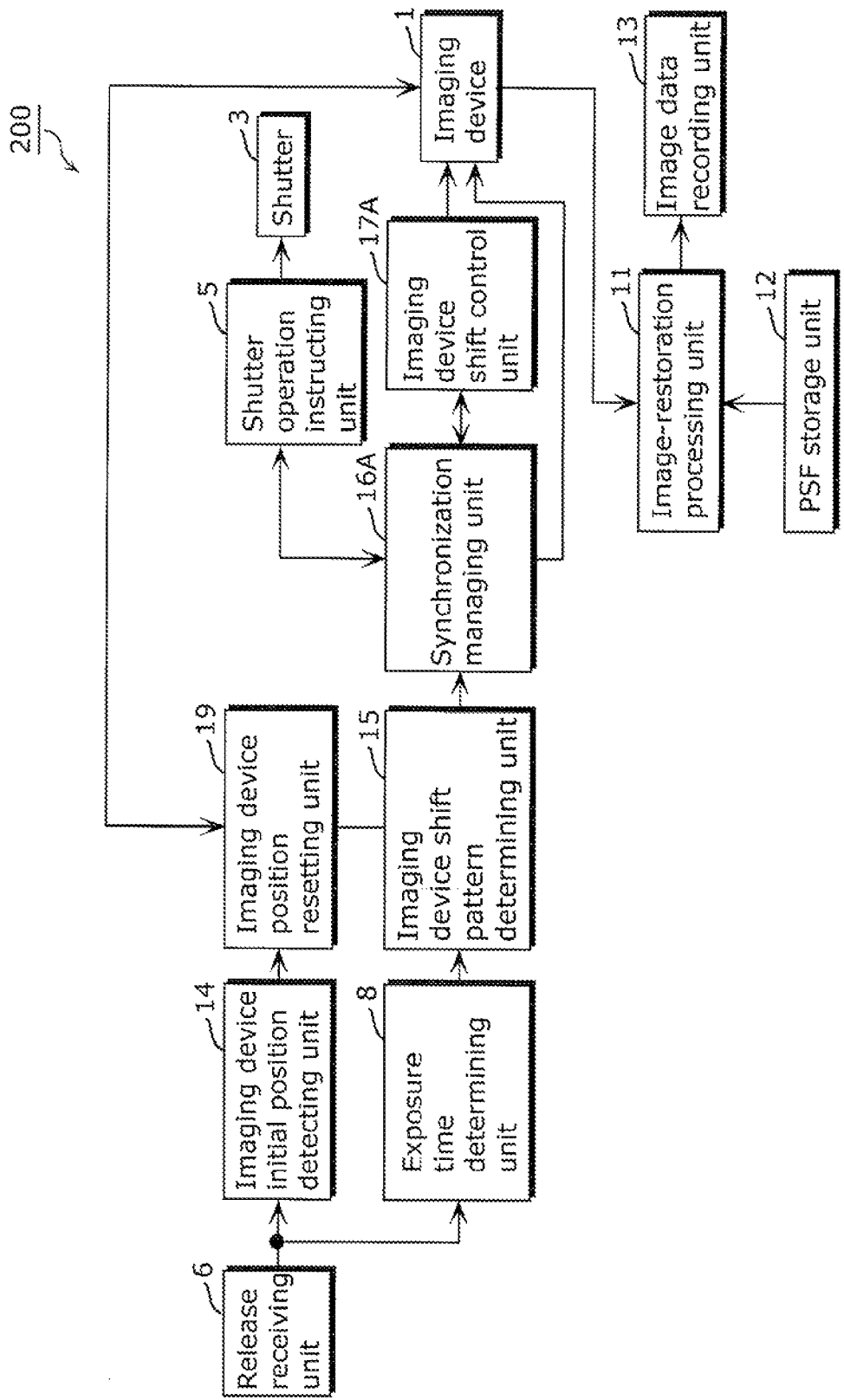
FIG. 20 depicts a block diagram of an imaging apparatus according to Embodiment 2 of the present invention.
Figure 21:
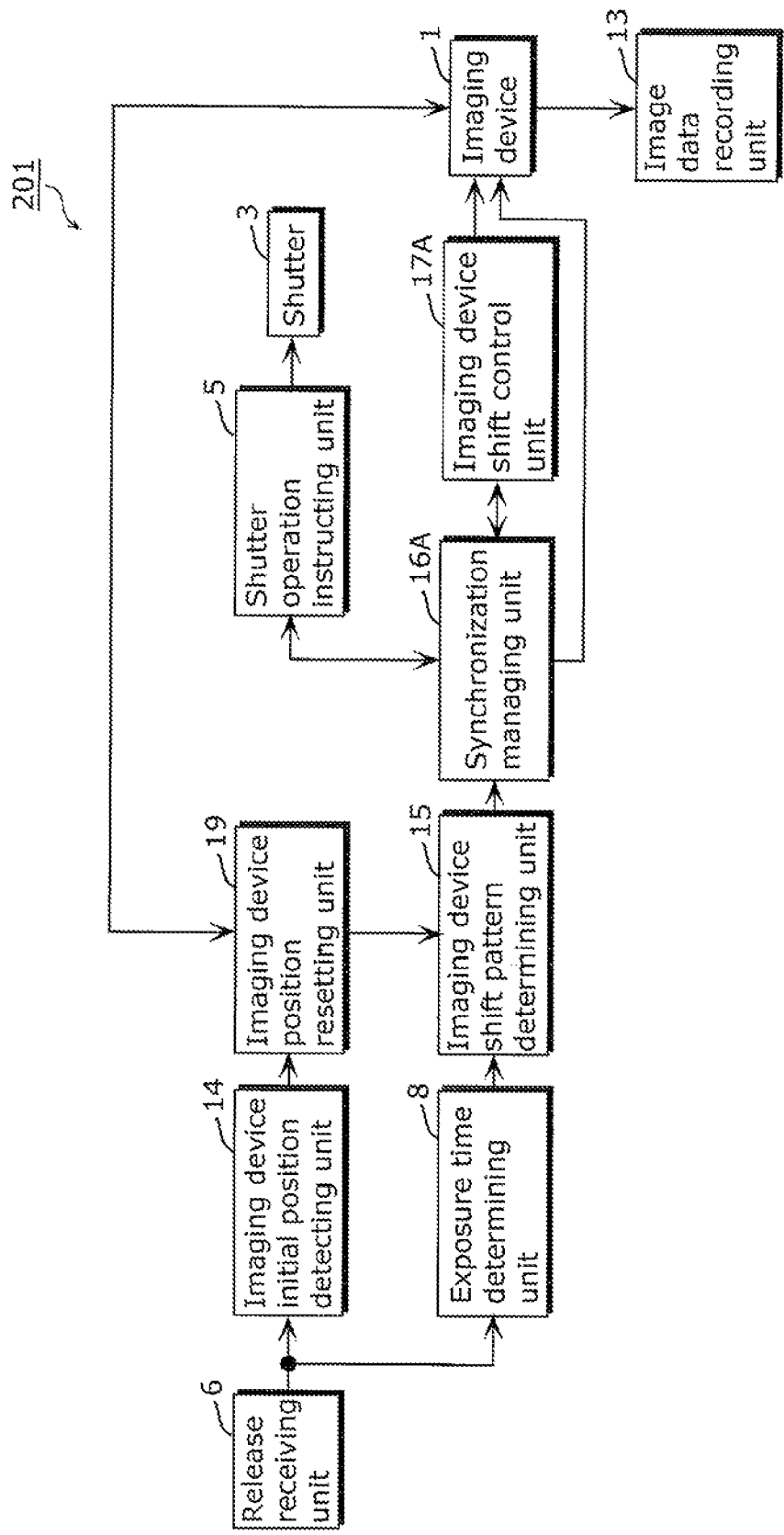
FIG. 21 depicts a modification of the block diagram of the imaging apparatus according to Embodiment 2 of the present invention.

Described is the imaging apparatus 200 according to Embodiment 2 of the present invention with reference to FIGS. 20 to 21.

FIG. 20 is a block diagram of the imaging apparatus 200 according to Embodiment 2 of the present invention. Instead of the focus lens initial position detecting unit 7, the focus lens position resetting unit 18, the focus lens shift pattern determining unit 9, the synchronization managing unit 10A, and the focus lens shift control unit 4A included in the imaging apparatus 100 shown in FIG. 10, the imaging apparatus 200 includes the imaging device initial position detecting unit 14, the imaging device position resetting unit 19, an imaging device shift pattern determining unit 15, a synchronization managing unit 16A, and an imaging device shift control unit 17A. It is noted that the same constituent features between FIGS. 10 and 20 share the same numeral references. Thus mainly described hereinafter are the differences therebetween.

In addition, even though the lens 2 is not shown in FIG. 20, the lens 2 may be included in the imaging apparatus 200.

In the imaging apparatus 200 according to Embodiment 2 of the present invention, for example, the lens 2 is stationary, and the imaging device 1 can shift its relative position with respect to the lens 2.

The imaging device shift control unit 17A is a specific example of the shift control unit 22 in FIG. 9. The imaging device shift control unit 17A moves the position of the imaging device 1 to shift the focal point.

The imaging device shift pattern determining unit 15 is a specific example of the shift pattern determining unit 21 in FIG. 9.

When the release receiving unit 6 receives an exposure start instruction from the user, the imaging device initial position detecting unit 14 detects the position of the imaging device 1 at that time (initial position).

Once the imaging device initial position detecting unit 14 detects the initial position, the imaging device position resetting unit 19 resets the position of the imaging device 1 based on the initial position. Specifically, the imaging device position resetting unit 19 shifts the position of the imaging device 1 to a predetermined end position, such as the nearest end or the farthest end.

When the release receiving unit 6 receives the instruction to release the shutter, the exposure period determining unit 8 immediately determines the exposure time based on the image scene. The imaging device position resetting unit 19 resets the imaging device 1, and at the same time, the exposure time determining unit 8 determines imaging parameters including a shutter speed and an f-number.

Figure 1:
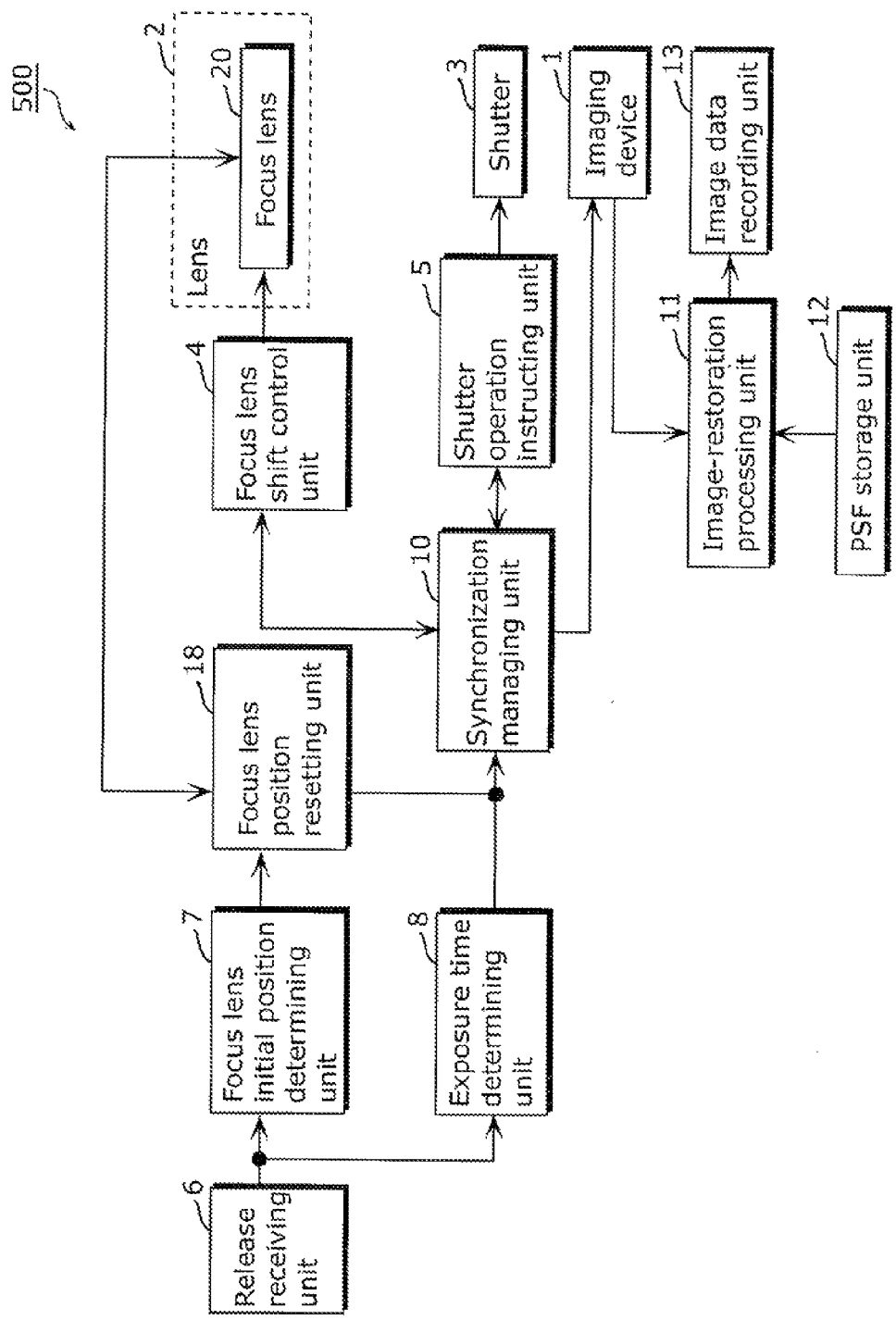
FIG. 1 depicts a block diagram of a conventional imaging apparatus.
Figure 2:
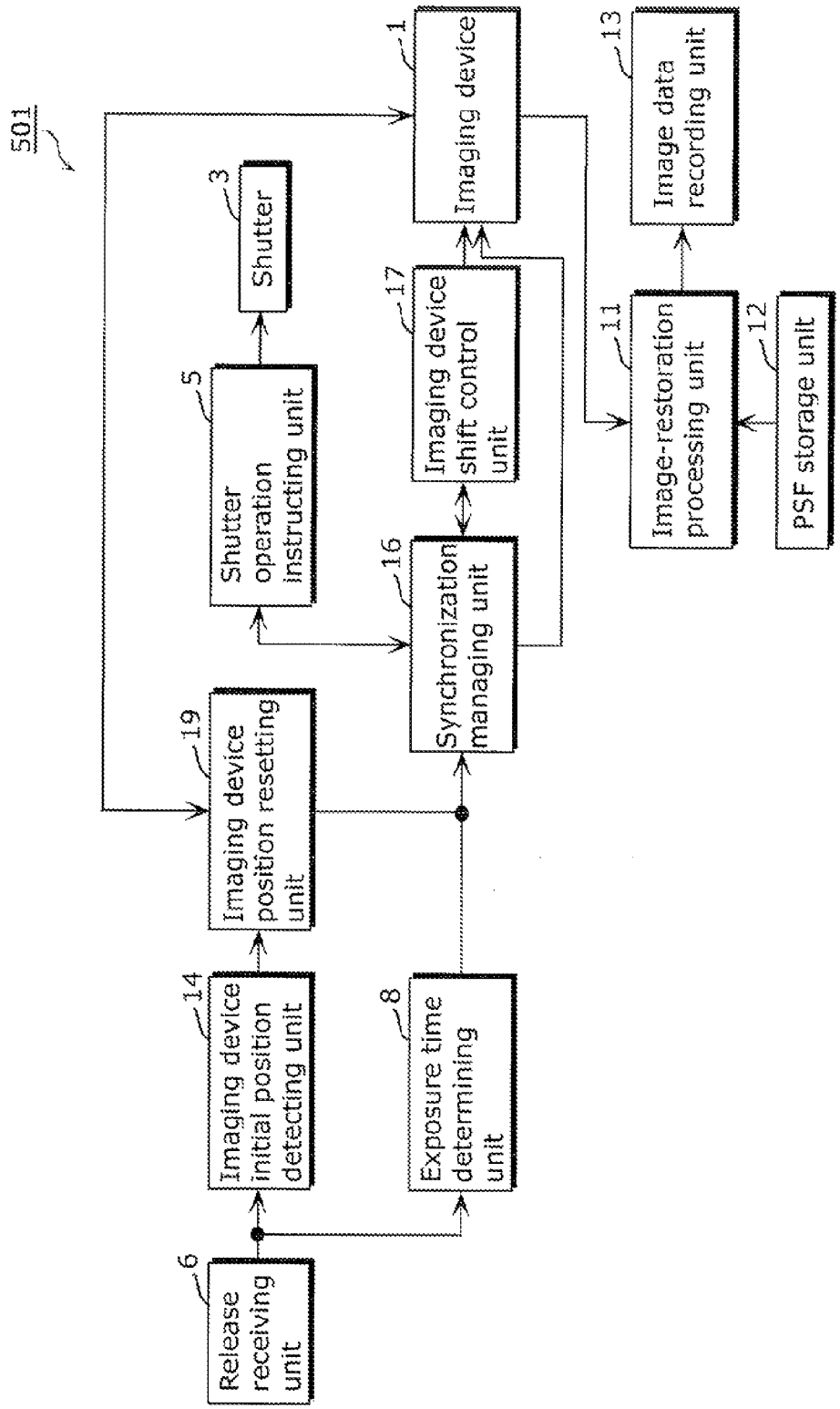
FIG. 2 depicts a block diagram of a conventional imaging apparatus.
Figure 3:
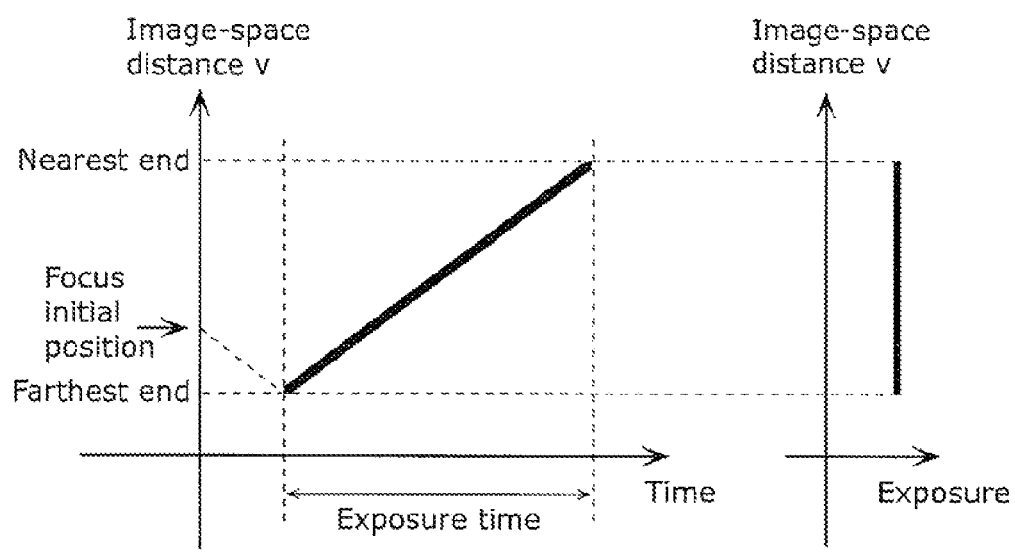
FIG. 3 exemplifies a shift pattern of the conventional imaging apparatus.
Figure 4:
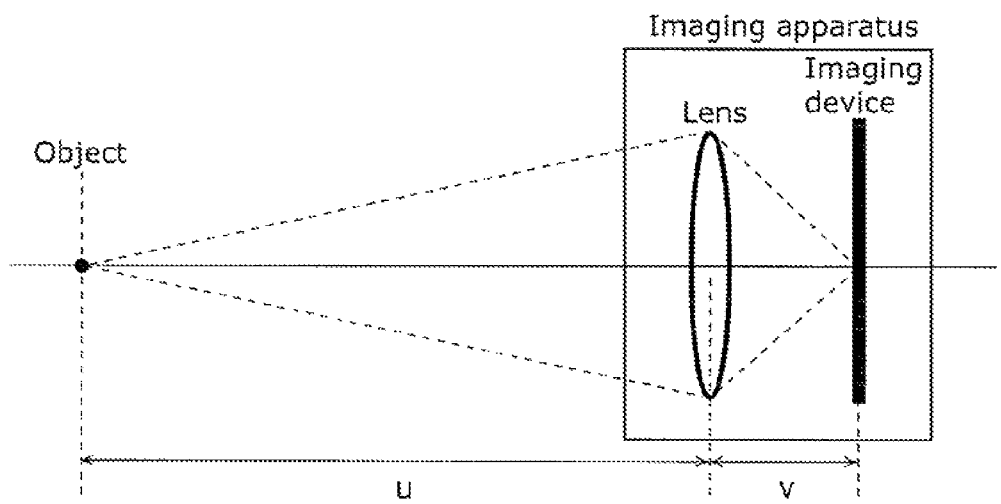
FIG. 4 shows a positional relationship between an object-space distance and an image-space distance.

When the imaging device position resetting unit 19 finishes resetting the position of the imaging device 1, concurrently, the imaging device shift pattern determining unit 15 determines, for example, a shift pattern of the focal point using information on the exposure time determined by the exposure time determining unit 8. Then imaging device shift pattern determining unit 15 determines a shift pattern of the imaging device 1 in conformity with the shift pattern of the focal point, and notifies the synchronization managing unit 16A of the determined shift pattern of the imaging device 1. It is noted that when the position of the lens does not shift in the case where the imaging device 1 is shifted, the shift pattern of the focal point is the shift pattern of the imaging device 1 itself as shown in FIG. 4. Based on the shift pattern of the imaging device 1, the synchronization managing unit 16A manages to synchronize the start and the end of the exposure with the operations of the imaging device shift control unit 17A and the shutter operation instructing unit 5.

Specifically, the synchronization managing unit 16A gives an exposure start instruction to the imaging device shift control unit 17A and the shutter operation instructing unit 5. Upon receiving the exposure start instruction, the shutter operation instructing unit 5 causes the shutter 3 to open. After a predetermined exposure time elapses, the synchronization managing unit 16A instructs the shutter operation instructing unit 5 to end the exposure.

On receiving the exposure end instruction, the shutter operation instructing unit 5 causes the shutter 3 to close.

When the optical image of the object is formed on the imaging device 1, the formed optical image is converted to an image signal; that is an electric signal, by the imaging device 1. The image signal is provided to the image-restoration processing unit 11. Simultaneously, the synchronization managing unit 16A notifies the image-restoration processing unit 11 that the exposure has ended, and an image has been obtained employing the F-DOF-based imaging device shifting. Operations other than the above are in conformity with those in the focus lens shifting shown in FIG. 10.

It is noted that the shift pattern of the imaging device 1 is in conformity with the pattern in FIG. 11 described in Embodiment 1. Embodiment 2 is different from the Embodiment 1 in that the imaging device 1 itself shifts in Embodiment 2. Embodiments 1 and 2 have the same shift pattern. Embodiment 2 is the same as Embodiment 1 in that the acceleration/deceleration time t is limited between 0.1 and 0.25 for one frame time T.

As described above, the imaging apparatus 200 according to Embodiment 2 of the present invention carries out the above-described control in order to capture a moving picture and sequential still pictures employing the EDOF adopting the F-DOE, as the imaging apparatus 100 does in Embodiment 1. At the same time, the imaging apparatus 200 according to Embodiment 2 of the present invention successfully improves the image quality at the ends of the range of focus.

It is noted that the imaging apparatus 200 of the present invention does not have to include all the processing units shown in FIG. 20.

FIG. 21 is a block diagram of an imaging apparatus 201 which is a modification of the imaging apparatus 200 according to Embodiment 2. The structure and effects of the imaging apparatus 201 are similar to those shown in FIG. 20. Compared with the imaging apparatus 200 in FIG. 20, the imaging apparatus 201 is characterized by directly recording, on image data recording unit 13, an image obtained through the exposure. This structure intends to achieve the image-restoration processing to be executed not in the imaging apparatus but on an external apparatus, such as a personal computer, an image viewer, or a network server. Hence, compared with the structure of the imaging apparatus 200 in FIG. 20, the imaging apparatus 201 can significantly reduce a shutter time lag while reducing a calculation amount for the imaging apparatus.

Although only some exemplary embodiments of this invention have been described in detail above, those skilled in the art will readily appreciate that many modifications are possible in the exemplary embodiments without materially departing from the novel teachings and advantages of this invention.

Furthermore, at least some of processing units included in the imaging apparatuses according to the embodiments may be configured from an LSI (Large-Scale Integration); namely, an integrated circuit. These processing units may be made as separate individual chips, or as a single chip to include a part or all of the processing units.

Moreover, the means for circuit integration is not limited to an LSI; instead, a dedicated circuit or a general-purpose processor is employed as the means. In addition, it is also acceptable to use a Field Programmable Gate Array (FPGA) that is programmable after the LSI has been manufactured, or to use a reconfigurable processor in which connections and settings of circuit cells within the LSI are reconfigurable.

In addition, some of the functions of the imaging apparatuses according to the embodiments of the present invention may be carried out by a processor, including the CPU, executing a program.

Furthermore, the present invention may be the program, and a non-transitory computer-readable recording medium which stores the program. Obviously, the program can be distributed via a transmission media, such as the Internet.

Moreover, at least some of the functions of the imaging apparatuses and the modifications thereof according to the embodiments may be combined.

In addition, all of the above-shown figures are exemplified to describe the present invention in detail. Thus the present invention shall not be limited to the exemplified figures.

Furthermore, all such modifications are intended to be included within the scope of this invention.

INDUSTRIAL APPLICABILITY

The present invention is applicable to imaging apparatuses and control methods thereof, and in particular, to moving picture capturing and sequential still pictures capturing employing the F-DOE. Furthermore, the present invention is effective in a field of, for example, household- and industrial-use imaging apparatuses (digital still cameras).

REFERENCE SIGNS LIST

1 Imaging device
2 Lens
3 Shutter
4 and 4A Focus lens shift control unit
5 Shutter operation instructing unit
6 Release receiving unit
7 Focus lens initial position determining unit
8 Exposure time determining unit
9 Focus lens shift pattern determining unit
10 and 10A Synchronization managing unit
11 Image-restoration processing unit
12 PSF storage unit
13 Image data recording unit
14 Imaging device initial position determining unit
15 Imaging device shift pattern determining unit
16 and 16A Synchronization managing unit
17 and 17A Imaging device shift control unit
18 Focus lens position resetting unit
19 Imaging device initial position resetting unit
20 Focus lens
21 Shift pattern determining unit
22 Shift control unit
100, 101, 200, 201, 500, and 501 Imaging apparatus

The invention claimed is:

1. An imaging apparatus comprising:
an imaging device;
a lens which forms an image and collects light on said imaging device;
a shift control unit configured to shift an object-space focal point of said imaging apparatus by shifting an image-space distance between said imaging device and said lens;
an exposure time determining unit configured to determine an exposure time based on an image scene; and
a shift pattern determining unit configured to determine a shift pattern of the image-space distance, such that the focal point moves from one end to an other end of a predetermined range of focus during an exposure period of which duration is the exposure time, the image-space distance being shifted by said shift control unit, and the shift pattern being found in a frame period including the exposure period,
wherein said shift pattern determining unit is configured to determine the shift pattern such that:
a shift speed of the image-space distance increases from zero during an acceleration period included in the frame period;
the image-space distance shifts at a constant speed during a constant speed period included in the frame period and following the acceleration period; and
the shift speed of the image-space distance decreases to zero during a deceleration period included in the frame period and following the constant speed period, and
each of the acceleration period and the deceleration period has a duration equal to or longer than one-tenth of the frame period.

2. The imaging apparatus according to claim 1, wherein the duration of each of the acceleration period and the deceleration period is equal to or shorter than one-fourth of the frame period.

3. The imaging apparatus according to claim 1,
wherein shift pattern determining unit is configured to determine the shift pattern such that:
the shift speed of the image-space distance increases at constant acceleration during the acceleration period; and
the shift speed of the image-space distance decreases at constant deceleration during the deceleration period.

4. The imaging apparatus according to claim 1,
wherein the frame period includes the exposure period, a first non-exposure period preceding the exposure period, and a second non-exposure period following the exposure period,
at least part of the acceleration period is included in the first non-exposure period, and
at least part of the deceleration period is included in the second non-exposure period.

5. The imaging apparatus according to claim 1,
wherein said shift control unit is configured to shift the image-space distance by moving a position of said lens.

6. The imaging apparatus according to claim 1,
wherein said shift control unit is configured to shift the image-space distance by moving a position of said imaging device.

7. The imaging apparatus according to claim 1, further comprising:
a Point Spread Function (PSF) storage unit configured to store in advance a restoration PSF;
an image-restoration processing unit configured to carry out image-restoration processing on image data generated by said imaging device, using the restoration PSF; and
an image data recording unit configured to record an image restored by said image-restoration processing unit.

8. A control method for controlling an imaging apparatus including an imaging device and a lens which forms an image and collects light on the imaging device, said method comprising:
shifting an object-space focal point of the imaging apparatus by shifting an image-space distance between the imaging device and the lens;
determining an exposure time based on an image scene;
determining a shift pattern of the image-space distance, such that the focal point moves from one end to an other end of a predetermined range of focus during an exposure period of which duration is the exposure time, the image-space distance being shifted in said shifting, and the shift pattern being found in a frame period including the exposure period,
wherein, in said determining, the shift pattern of the image-space distance is determined such that:
a shift speed of the image-space distance increases from zero during an acceleration period included in the frame period;
the image-space distance shifts at a constant speed during a constant speed period included in the frame period and following the acceleration period; and
the shift speed of the image-space distance decreases to zero during a deceleration period included in the frame period and following the constant speed period, and
each of the acceleration period and the deceleration period has a duration equal to or longer than one-tenth of the frame period.

* * * * *